United States Patent
Hamanaka

(10) Patent No.: US 9,369,039 B2
(45) Date of Patent: Jun. 14, 2016

(54) DRIVING DEVICE, LIGHT-EMITTING DEVICE, PROJECTION DEVICE, CONTROL METHOD, AND STORAGE MEDIUM

(71) Applicant: CASIO COMPUTER CO., LTD., Tokyo (JP)

(72) Inventor: Hideo Hamanaka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 8 days.

(21) Appl. No.: 14/470,436

(22) Filed: Aug. 27, 2014

(65) Prior Publication Data

US 2015/0061544 A1    Mar. 5, 2015

(30) Foreign Application Priority Data

Aug. 30, 2013  (JP) ................................. 2013-178922

(51) Int. Cl.
*H02M 3/156*     (2006.01)
*H05B 33/08*     (2006.01)
*H05B 41/392*    (2006.01)
*H02M 1/00*      (2006.01)

(52) U.S. Cl.
CPC ........... *H02M 3/156* (2013.01); *H05B 33/0815* (2013.01); *H05B 33/0818* (2013.01); *H02M 2001/008* (2013.01); *H02M 2001/0019* (2013.01); *H05B 41/3927* (2013.01)

(58) Field of Classification Search
CPC ........... H05B 41/2824; H05B 41/3921; H05B 33/0812; H05B 33/0872
USPC ................. 315/247, 224, 225, 291, 307–326, 315/209 R, 185 S
See application file for complete search history.

(56) References Cited

U.S. PATENT DOCUMENTS

| | | | | |
|---|---|---|---|---|
| 7,276,861 B1 * | 10/2007 | Shteynberg | ........... | H02M 3/157 315/224 |
| 8,344,638 B2 * | 1/2013 | Shteynberg | ........ | H05B 33/0815 315/185 S |
| 8,975,826 B1 * | 3/2015 | Stevens | .............. | H05B 33/0815 315/185 S |
| 9,190,917 B2 * | 11/2015 | Hwang | ............. | H02M 3/33523 |

(Continued)

FOREIGN PATENT DOCUMENTS

CN    101512883 A    8/2009
CN    101849438 A    9/2010

(Continued)

OTHER PUBLICATIONS

Chinese Office Action dated Mar. 25, 2016, in a counterpart Chinese patent application No. 201410432975.1.

*Primary Examiner* — Tuyet Vo
(74) *Attorney, Agent, or Firm* — Chen Yoshimura LLP

(57) ABSTRACT

A driving device includes: a power source circuit that converts inputted power to a constant voltage or constant current power, and outputs this converted power; a driver circuit that supplies the power outputted by the power source circuit to a load; and a control unit that receives the voltage or current of the power outputted by the power source circuit, calculates a value by multiplying a control gain by a difference of the detected value and a constant target value, and outputs a feedback signal based on this calculated value to the power source circuit, thereby performing feedback control on the power source circuit, the control unit raising the control gain when the voltage or current of the power outputted by the driver circuit is changed.

18 Claims, 10 Drawing Sheets

(56) References Cited

U.S. PATENT DOCUMENTS

| | | |
|---|---|---|
| 2008/0290811 A1 | 11/2008 | Yoshida |
| 2009/0190375 A1 | 7/2009 | Manabe et al. |
| 2010/0045195 A1 | 2/2010 | Yamamuro et al. |
| 2010/0219765 A1 | 9/2010 | Toda et al. |

FOREIGN PATENT DOCUMENTS

| | | |
|---|---|---|
| JP | 2008159329 A | 7/2008 |
| JP | 2008-234842 A | 10/2008 |
| JP | 2010-049523 A | 3/2010 |
| JP | 2013090400 A | 5/2013 |

* cited by examiner

DRIVING DEVICE, LIGHT-EMITTING DEVICE, PROJECTION DEVICE, CONTROL METHOD, AND STORAGE MEDIUM

BACKGROUND OF THE INVENTION

1. Field of the Invention

The present invention relates to a driving device, a light-emitting device, a projection device, a control method, and a storage medium.

2. Description of Related Art

Japanese Patent Application Laid-Open Publication No. 2008-234842 discloses a field sequential-type projection device. A field sequential-type projection device projects a color image by sequentially and repetitively radiating red light, green light, and blue light to a display element. In particular, a projection device disclosed in Japanese Patent Application Laid-Open Publication No. 2008-234842 sequentially and repetitively illuminates red light-emitting diodes, green light-emitting diodes, and blue light-emitting diodes using one DC/DC converter. The voltages of the red light-emitting diodes, the green light-emitting diodes, and the blue light-emitting diodes differ during illumination, and these are driven by one DC/DC converter, and thus, the voltage outputted by the DC/DC converter changes in synchronization with the start of illumination of the red light-emitting diodes, the green light-emitting diodes, and the blue light-emitting diodes, respectively.

SUMMARY OF THE INVENTION

An input terminal of this DC/DC converter is connected to an output terminal of an AC/DC converter. If the voltage outputted by the AC/DC converter is not stable, then the voltage outputted by the DC/DC converter is also unstable, and thus, the AC/DC converter is provided with a stabilization circuit. If the stabilization circuit provided in the AC/DC converter is of a switching type, then it is preferable that the stabilization circuit and the DC/DC converter be controlled with one controller in order to reduce the number of components or the like. If the stabilization circuit and the DC/DC converter are controlled by one controller in this manner, then when the voltage outputted by the DC/DC converter is changed, then due to control cycles, there is an increased susceptibility to response delay for the voltage outputted by the stabilization circuit. As a result, when changing the voltage outputted by the DC/DC converter by turning ON and OFF the load, then pulsations (glitches) in the voltage outputted by the stabilization circuit become greater, and as a result, the pulsation increases in the voltage outputted by the DC/DC converter (waveform becomes rounded). A problem to be solved by the present invention is to mitigate the occurrence of pulsation in output from a power source circuit that is a switching-type stabilization circuit when output from a driver circuit changes when controlling a driving device in which a driver circuit driving a load is connected to a power circuit.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a driving device for driving a load, including: a power source circuit that converts power inputted thereto to a power of a constant voltage or a constant current, and then outputs the power that has been converted; a driver circuit that receives the power outputted by the power source circuit and outputs a power to the load; and a control unit performing feedback control on the power source circuit, the control unit receiving a voltage or a current of the power outputted by the power source circuit as a detected value, and outputting to the power source circuit a feedback signal based on a value obtained by multiplying a difference of the detected value and a constant target value by a control gain, wherein the control gain is increased when a voltage or a current of the power outputted from the driver circuit is to change.

In another aspect, the present disclosure provides a method of controlling a power source circuit that converts power inputted thereto to a constant power and outputs the power that has been converted, and a driver circuit that receives the power outputted by the power source circuit and outputs a power to a load that includes: performing feedback control on the power source circuit by receiving a voltage or a current of the power outputted by the power source circuit as a detected value, obtaining a value by multiplying a difference of the detected value and a constant target value by a control gain, and by outputting a feedback signal based on the value to the power source circuit; and increasing the control gain when a voltage or a current of the power outputted from the driver circuit is to change.

In another aspect, the present disclosure provides a non-transitory storage medium to be read by a control unit of a driving device including: a power source circuit that converts power inputted thereto to a power of a constant voltage or a constant current, and then outputs the power that has been converted; a driver circuit that receives the power outputted by the power source circuit and outputs a power to the load; and the control unit, the control unit performing feedback control on the power source circuit and feedback control on the driver circuit to control a voltage or a current of the power outputted by the driver circuit, the storage medium storing a data array in which a plurality of data are arranged in chronological order, the plurality of data including a control gain to be used by the control unit such that when the storage medium is read by the control unit, the control unit successively reads in the control gain to perform the feedback control on the power source circuit by receiving the voltage or the current of the power outputted by the power source circuit as a detected value, obtaining a value by multiplying a difference of the detected value and a constant target value by the control gain retrieved from the storage medium, and outputting a feedback signal based on the value to the power source circuit, wherein the control gain in the data array is set to a constant value except when the voltage or the current of the power outputted by the driver circuit is to change, the control gain being set to a value greater than the constant value when the voltage or the current of the power outputted by the driver circuit is to change.

It is to be understood that both the foregoing general description and the following detailed description are exemplary and explanatory, and are intended to provide further explanation of the invention as claimed.

DETAILED DESCRIPTION OF THE PREFERRED EMBODIMENTS

Embodiments of the present invention will be described below with reference to drawings. The embodiments described below have various limitations that are technically preferred in order to implement the present invention.

Thus, the technical scope of the present invention is not limited to the embodiments and drawing examples below.

Embodiment 1

Figure 1:
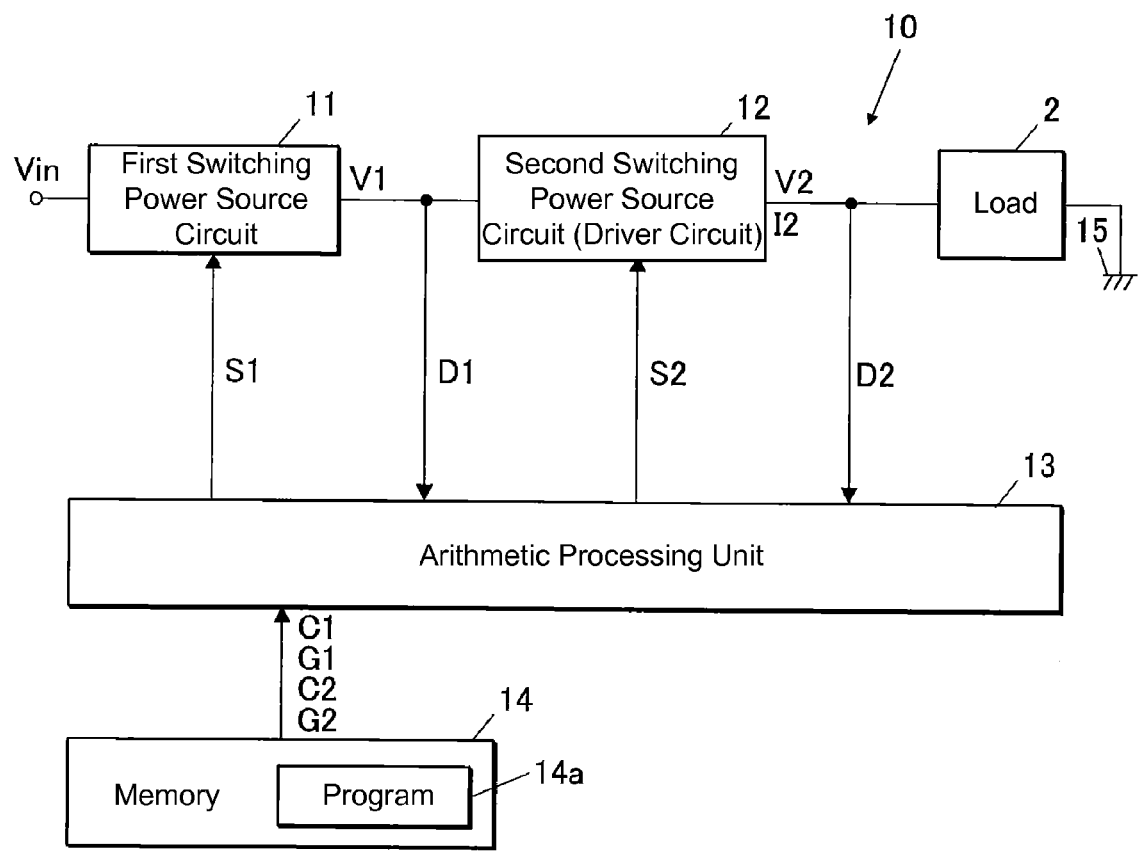
FIG. 1 is a block diagram of a driving device according to Embodiment 1 of the present invention.

FIG. 1 is a block diagram of a driving device 10 for a load 2.

The driving device 10 drives the load 2. Specifically, the driving device 10 starts and stops the load 2 in a periodic manner. The load 2 is a light source (semiconductor light-emitting element (light-emitting diode, laser diode, organic light-emitting diode, organic EL element, or the like, for example), an incandescent lamp, a discharge lamp, or the like), a resistor, a heater, a motor, or the like. If the load 2 is a light source, then the device including the driving device 10 and the load 2 is a light-emitting device.

This driving device 10 includes a first switching power source circuit 11, a second switching power source circuit 12, an arithmetic processing unit 13 (control unit), a memory 14 (non-transitory storage medium), and the like.

The arithmetic processing unit 13 is a processor such as a microcomputer or a digital signal processor (DSP). The memory 14 is a non-volatile semiconductor memory. The memory 14 may be provided in the arithmetic processing unit 13 or outside the arithmetic processing unit 13.

An input terminal of the first switching power source circuit 11 is an input terminal of the driving device 10, and an output terminal of a second switching power source circuit 12 is an output terminal of the driving device 10. The second switching power source circuit 12 and the load 2 are connected in series to an output terminal of the first switching power source circuit 11 and to a reference potential node 15 (ground), the output terminal of the first switching power source circuit 11 is connected to the input terminal of the second switching power source circuit 12, the output terminal of the second switching power source circuit 12 is connected to the load 2, and the load 2 is connected to the reference potential node 15.

The first switching power source circuit 11 is a direct current output-type and constant voltage output-type DC-DC converter. In other words, the first switching power source circuit 11 is a DC-DC converter that converts direct current power of a voltage Vin to direct current power of a voltage V1. More specifically, the first switching power source circuit 11 is a switching regulator that converts the direct current power of the voltage Vin to the direct current power of the voltage V1 by repeatedly turning ON and OFF a direct current inputted to the first switching power source circuit 11. The first switching power source circuit 11 has a switching element, an inductor, a smoothing circuit, and the like.

The direct current power of the voltage Vin is generated by an AC-DC converter. The voltage Vin may be stabilized by a stabilization circuit provided in the AC-DC converter, or the voltage Vin may be stabilized without a stabilization circuit being provided in the AC-DC converter.

The method of controlling the first switching power source circuit 11 is of pulse width modulation (PWM) type, and a PWM signal S1 having a constant period is inputted to the first switching power source circuit 11, thereby controlling the first switching power source circuit 11. The PWM signal S1 is outputted by the arithmetic processing unit 13, and a duty ratio (pulse width) of the PWM signal S1 is controlled by the arithmetic processing unit 13. Here, the arithmetic processing unit 13 performs feedback control on the first switching power source circuit 11. In other words, the voltage V1 outputted by the first switching power source circuit 11 is inputted into the arithmetic processing unit 13 as a detected value D1, and the arithmetic processing unit 13 controls the outputted voltage V1 so as to be a target value C1 by controlling the voltage V1 outputted by the first switching power source circuit 11 on the basis of the difference calculated between the detected value D1 and the target value C1. More specifically, during one period of the PWM signal S1, the arithmetic processing unit 13 receives the detected value D1 as input and calculates the difference between the detected value D1 and the target value C1, determines a duty ratio on the basis of the value obtained by multiplying the difference by a control gain G1, and outputs the PWM signal S1 of the duty ratio to the first switching power source circuit 11. The arithmetic processing unit 13 determines the duty ratio every period of the PWM signal S1.

The voltage V1 controlled in this manner is applied to the input terminal of the second switching power source circuit 12, and a direct current power of the voltage V1 is supplied to the second switching power source circuit 12.

The second switching power source circuit 12 is a DC-DC converter that outputs direct current. The second switching power source circuit 12 is a constant voltage source or a constant current source. If the second switching power source circuit 12 is a constant voltage source, then the second switching power source circuit 12 is a switching regulator that converts the direct current power of the voltage V1 to a direct current power of a constant voltage V2 by repeatedly switching ON and OFF a direct current inputted from the first switching power source circuit 11. If the second switching power source circuit 12 is a constant current source, then the second switching power source circuit 12 is a switching regulator that converts the direct current power of the voltage V1 to direct current power having a constant current I2 by repeatedly switching ON and OFF a direct current inputted from the first switching power source circuit 11. The second switching power source circuit 12 has a switching element, an inductor, a smoothing circuit, and the like.

The method of controlling the second switching power source circuit 12 is pulse width modulation (PWM), and a PWM signal S2 having a constant period is outputted to the second switching power source circuit 12 by the arithmetic processing unit 13, and the arithmetic processing unit 13 performs feedback control on the second switching power source circuit 12 by controlling a duty ratio (pulse width) of the PWM signal S2. If the second switching power source circuit 12 is a constant voltage source, the voltage V2 outputted by the second switching power source circuit 12 is inputted to the arithmetic processing unit 13 as a detected value D2, and the arithmetic processing unit 13 controls the voltage V2 outputted by the second switching power source circuit 12 on the basis of the difference calculated between the detected value D2 and the target value C2, such that the voltage V2 becomes the target value C2. On the other hand, if the second switching power source circuit 12 is a constant current source, then the current I2 outputted from the second switching power source circuit 12 is inputted to the arithmetic processing unit 13 as the detected value D2, and the arithmetic processing unit 13 controls the current I2 outputted from the second switching power source circuit 12 on the basis of the difference calculated between the detected value D2 and the target value C2, such that the current I2 becomes the target value C2.

More specifically, whether the second switching power source circuit 12 is a constant voltage source or a constant current source, during one period of the PWM signal S2, the arithmetic processing unit 13 receives the detected value D2 as input and calculates the difference between the detected value D2 and the target value C2, determines a duty ratio on the basis of the value obtained by multiplying the difference by a control gain G2, and outputs the PWM signal S2 of the duty ratio to the second switching power source circuit 12. The arithmetic processing unit 13 determines the duty ratio every period of the PWM signal S2.

If the current I2 is sent as feedback to the arithmetic processing unit 13 as the detected value D2, a resistor is provided between the second switching power source circuit 12 and a load 2, and the voltage of this resistor is sent as feedback to the arithmetic processing unit 13 as the detected value D2 and the current I2.

The target values C1 and C2 and the control gains G1 and G2 are stored in the memory 14, and the arithmetic processing unit 13 reads in the target values C1 and C2 and the control gains G1 and G2 from the memory 14. A control circuit that is separate from the arithmetic processing unit 13 (a microcomputer, for example) may output the target value C1 to the arithmetic processing unit 13 as a control signal, and the target value C1 may be variably controlled by the control circuit. This similarly applies to the target value C2.

Figure 2:
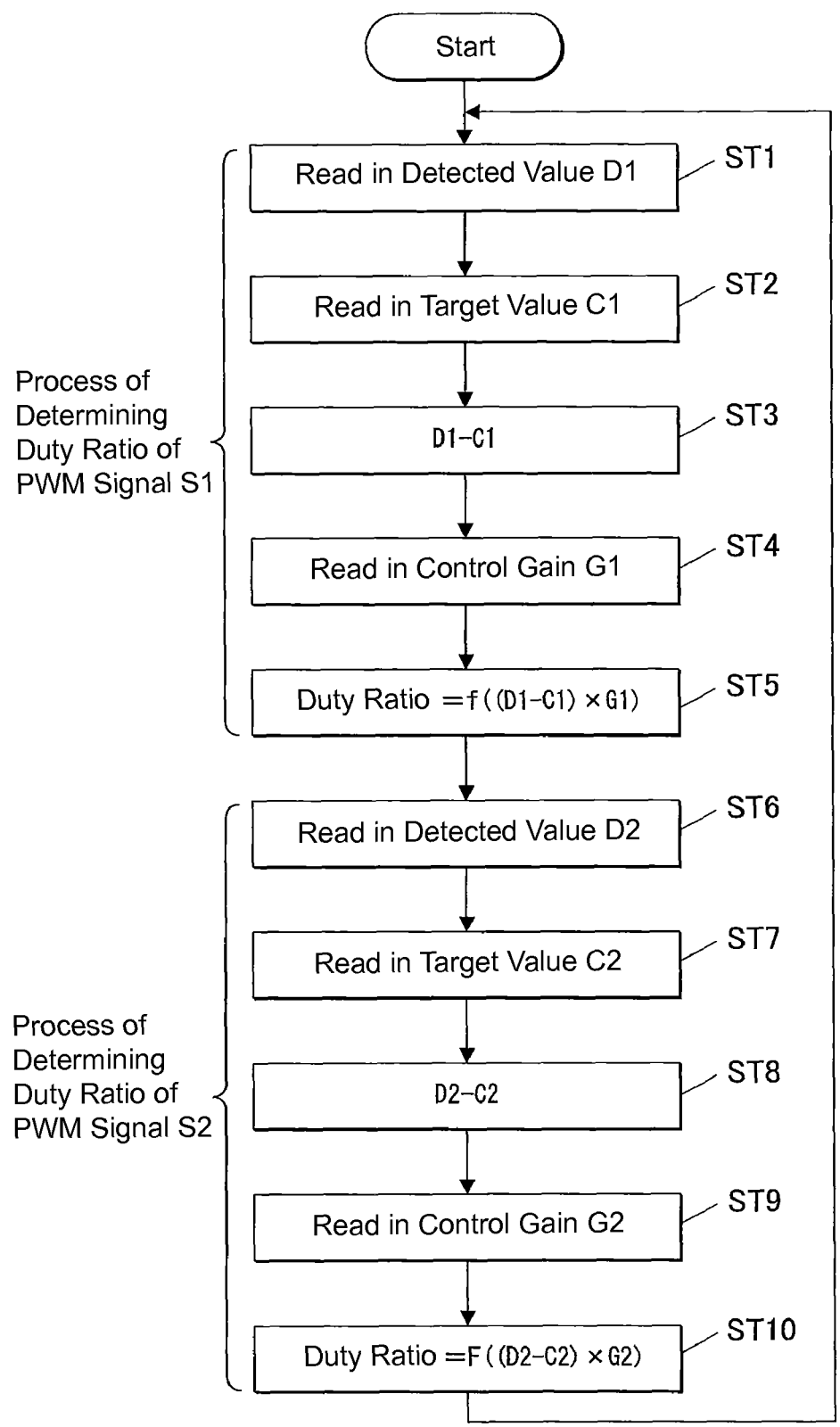
FIG. 2 is a chart showing a process flow in an arithmetic processing unit according to the same embodiment.

FIG. 2 shows a process flow conducted by the arithmetic processing unit 13 based on a program 14a stored in the memory 14. As shown in FIG. 2, the arithmetic processing unit 13 sequentially and repeatedly performs a duty ratio determination process for the PWM signal S1 and a duty ratio determination process for the PWM signal S2. Specifically, the process is as described below. In step ST1, the arithmetic processing unit 13 reads in the voltage V1 outputted by the first switching power source circuit 11 as the detected value D1. Next, in step ST2, the arithmetic processing unit 13 reads in the target value C1 from the memory 14. Next, in step ST3, the arithmetic processing unit 13 calculates the difference between the detected value D1 and the target value C1. Next, in step ST4, the arithmetic processing unit 13 reads in the control gain G1 from the memory 14. Next, in step ST5, the arithmetic processing unit 13 calculates a duty ratio based on a value obtained by multiplying this difference by the control gain G1, and the PWM signal S1 of this duty ratio is outputted to the first switching power source circuit 11. The "f" in FIG. 2 represents a function for determining the duty ratio based on the value obtained by multiplying the difference by the control gain G1. Next, in step ST6, the arithmetic processing unit 13 reads in the voltage V2 or the current I2 outputted from the second switching power source circuit 12 as the detected value D2. Next, in step ST7, the arithmetic processing unit 13 reads in the target value C2 from the memory 14. Next, in step ST8, the arithmetic processing unit 13 calculates the difference between the detected value D2 and the target value C2. Next, in step ST9, the arithmetic processing unit 13 reads in the control gain G2 from the memory 14. Next, in step ST10, the arithmetic processing unit 13 calculates a duty ratio based on a value obtained by multiplying this difference by the control gain G2, and the PWM signal S2 of this duty ratio is outputted to the second switching power source circuit 12. The "F" in FIG. 2 represents a function for determining the duty ratio based on the value obtained by multiplying the difference by the control gain G2. Then, the process flow of the arithmetic processing unit 13 returns to the step ST1.

The process of steps ST1 to ST10 of FIG. 2 is a process conducted during one period of the PWM signal S1 and the PWM signal S2. The arithmetic processing unit 13 repeats the process of steps ST1 to ST10 of FIG. 2, resulting in the PWM signals S1 and S2 being received and outputted to the respective switching power source circuits 11 and 12, and thus, the arithmetic processing unit 13 performs feedback control on the switching power source circuits 11 and 12.

Figure 3:
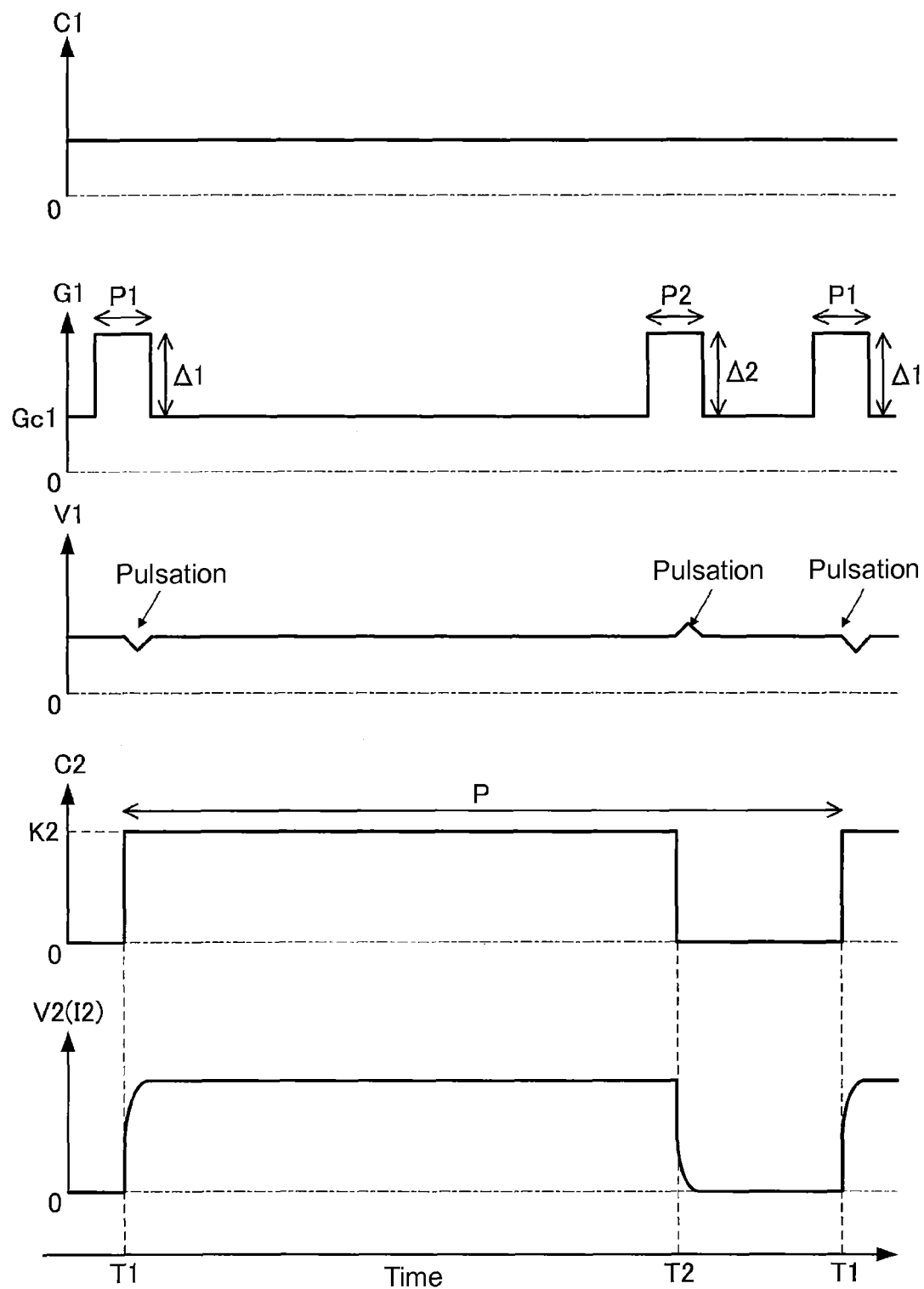
FIG. 3 is a chart that shows in chronological order a data structure of a target value and control gain stored in a storage medium according to the same embodiment, and that shows a change in output resulting from feedback control.

The target values C1 and C2 stored in the memory 14 will be described with reference to FIG. 3. FIG. 3 shows timing charts of data structures of the target values C1 and C2 and the control gain G1 stored in the memory 14, and the change in the voltage V2 (or current I2) and the voltage V1 due to feedback control. In FIG. 3, a plurality of data values of the control gain G1 are arranged in chronological order, and these data values are joined together by a solid line. This similarly applies to the target values C1 and C2. In FIG. 3, the horizontal axis indicates time and the vertical axis represents the target values C1 and C2 and data values of the control gain G1, the voltage V2 (or the current I2), and the voltage V1.

As shown in FIG. 3, the target value C1 is a non-zero constant value. In other words, the data structure of the target value C1 includes a data array in which the plurality of data values are arranged in chronological order, and all data are equal (the data is non-zero). The data array of the target value C1 is stored in the memory 14 in order of address, and the address in the memory 14 corresponds to time. Thus, the process of step ST2 in FIG. 2 is performed repeatedly in order of addresses of the data array (in chronological order) of the target value C1, and thus, the data array of the target value C1 is read in in order of address (chronological order). The target value C1 may be read in to the program 14a for the arithmetic processing unit 13 as a prescribed constant.

Because the target value C1 is a constant value, if feedback control is performed on the first switching power source circuit 11 by the arithmetic processing unit 13, the voltage V1 outputted by the first switching power source circuit 11 is maintained at a constant value.

The target value C2 is not a constant value. In other words, the data structure of the target value C2 includes a data array in which a plurality of data values are arranged in chronological order, and the data array constitutes a pulse wave that changes periodically. The data array of the target value C2 includes a first data array arranged in chronological order as data of a constant K2 (K2≠0) and a second data array that includes zero as data in chronological order. The data array of the target value C2 is stored in the memory 14 in order of address, and the address in the memory 14 corresponds to time. Thus, the process of step ST7 in FIG. 2 is performed repeatedly in order of addresses of the data array (in chronological order) of the target value C2, and thus, the data array of the target value C2 is read in in order of address (chronological order). A period P of the data array of the target value C2 is sufficiently longer than the period of the PWM signals S1 and S2.

The data structure of the target value C2 is a pulse wave data array, and thus, if feedback control is performed on the second switching power source circuit 12 by the arithmetic processing unit 13, then the voltage or current outputted by the second switching power source circuit 12 changes so as to be a pulse wave. In other words, when the target value C2 is a constant K2, then the voltage V2 or the current I2 outputted by the second switching power source circuit 12 is maintained at a constant value. If the target value C2 falls to zero from the constant K2, then the voltage V2 or the current I2 outputted by the second switching power source circuit 12 falls. When the target value C2 is zero, then the PWM signal S2 does not change and the duty ratio (pulse width) of the PWM signal S2 is zero, no voltage/current is outputted by the second switching power source circuit 12, and the voltage V2 or the current I2 outputted by the second switching power source circuit 12 is maintained at zero. If the target value C2 rises from zero to the constant K2, then the voltage V2 or the current I2 outputted by the second switching power source circuit 12 rises.

In this manner, the second switching power source circuit 12 is a power source circuit that converts a voltage/current of the first switching power source circuit 11, and a driver circuit (driver) that fulfills the role of a switching circuit that supplies an intermittent voltage/current to a load. Here, an example will be described in which the second switching power source circuit 12 fulfills both roles, but the power source circuit and the switching circuit may be separate circuits.

When the voltage V2 or the current I2 of the second switching power source circuit 12 is not zero, then the load 2 operates, and if the voltage V2 or the current I2 is zero, then the load 2 stops. A switching element is provided between the output terminal of the second switching power source circuit 12 and the load 2 or between the load 2 and the reference potential node 15, and the switching element may turn ON and OFF in synchronization with the operation of the second switching power source circuit 12. In other words, the switching element turns ON when the target value C2 is at the constant K2, and the switching element is OFF when the target value C2 is at zero. In this case, the switching element is turned ON and OFF by the arithmetic processing unit 13 or turned ON and OFF by another circuit (microcomputer, timing generator, or the like). If the switching element is turned ON and OFF by another circuit, then the ON/OFF signal outputted from the other circuit to the switching element is also inputted to the arithmetic processing unit 13, and the switching element and the target value C2 are synchronized by the arithmetic processing unit 13.

Next, the data structure of the control gain G1 stored in the memory 14 will be described with reference to FIG. 3. The data structure of the control gain G1 includes a data array in which a plurality of data values are arranged in chronological order. The data array of the control gain G1 is stored in the memory 14 in order of address, and the address of the memory 14 corresponds to time. Thus, the process of step ST4 in FIG. 2 is performed repeatedly in order of addresses of the data array (in chronological order) of the control gain G1, and thus, the data array of the control gain G1 is read in in order of address (chronological order).

The control gain G1 is not a constant value. In other words, other than when the target value C2 changes, the data in the data array of the control gain G1 is at a constant Gc1, and when the target value C2 changes, the data in the data array of the control gain G1 is set higher than the constant Gc1.

Specifically, the control gain G1 rises to the constant Gc1 in synchronization with or immediately prior to the time T1 when the target value C2 rises from zero to the constant K2, and after the time T1 when the target value C2 rises from zero to the constant K2, the control gain G1 decreases to the constant Gc1, and during the period P1 therebetween, the data of the control gain G1 is set higher than the constant Gc1. Furthermore, the control gain G1 rises from the constant Gc1 in synchronization with or immediately prior to the time T2 when the target value C2 falls from the constant K2 to zero, and after the time T2 when the target value C2 falls from the constant K2 to zero, the control gain G1 falls to the constant Gc1, and in the period P2 therebetween, the control gain G1 is set higher than the constant Gc1. The control gain G1 remains at the constant Gc1 other than the above-mentioned periods.

A quantity of increase Δ1 and the period of increase P1 of the control gain G1 when the target value C2 rises is determined by experiment, simulation, or the like conducted in advance. Specifically, the quantity of increase Δ1 and the period of increase P1 take into account the size of the pulsation (glitch) that occurs in the voltage outputted by the first switching power source circuit 11 when the target value C2 and the voltage V2 (or current I2) changes. The quantity of increase Δ2 and the period of increase P2 of the control gain G1 when the target value C2 falls are similar.

The quantity of increase Δ1 and the quantity of increase Δ2 may be equal to or different from each other. The period of increase P1 and the period of increase P2 may be equal to or different from each other. If the effect or rise and the effect of fall are considered to be equal, then the quantity of increase Δ1 and the quantity of increase Δ2, and the period of increase P1 and the period of increase P2 may respectively be equal to each other. The waveform of the control gain G1 when the target value C2 rises is a pulse wave (refer to FIG. 3), a triangular wave, or a sine wave. The waveform of the control gain G1 when the target value C2 falls is similar.

The data array for such a control gain G1 is stored in the memory 14, and thus, the arithmetic processing unit 13 increases the control gain G1 (the control gain G1 of step ST4 performed for the xth time is higher than the control gain G1 of a previously performed step ST4) if the target value C2 changes when the sequential processes are repeated as shown in FIG. 2 (if the target value C2 of step ST7 performed for the xth time is different from the target value C2 of a next performed step ST7).

Feedback control may be performed on the quantity of increase Δ1 and the period of increase P1. In other words, the arithmetic processing unit 13 may determine the quantity of increase Δ1 and/or the period of increase P1 on the basis of the difference between the detected value D1 and the target value C1, and may increase the control gain G1 in the period of increase P1 to a value greater than the constant Gc1 by the quantity of increase Δ1 when the target value C2 rises. This also applies to the quantity of increase Δ2 and the period of increase P2.

The embodiment of the present invention described above has the following effects. (1) The waveform of the voltage or current outputted from the second switching power source circuit 12 is a pulse waveform, and the voltage or current outputted from the second switching power source circuit 12 changes (rises or falls). One arithmetic processing unit 13 sequentially performs a process to determine the duty ratio of the PWM signal S1 and a process to determine the duty ratio of the PWM signal S2 (refer to FIG. 2), and thus, if the duty ratio of the PWM signal S1 is determined based on normal gain after the voltage or current outputted from the second switching power source circuit 12 changes, the effect of change in the voltage or current outputted from the second switching power source circuit 12 is not completely absorbed, which results in a large pulsation due to the delay in response of the voltage outputted from the first switching power source circuit 11. Thus, when the voltage or current outputted from the second switching power source circuit 12 changes, there is a risk of pulsation occurring in the voltage outputted by the first switching power source circuit 11 (refer to FIG. 3). However, it is possible to increase the control gain G1 when the voltage or current outputted from the second switching power source circuit 12 changes, or in other words, when the target value C2 rises or falls, and thus, it is possible to mitigate delays in response of the voltage outputted from the first switching power source circuit 11, and it is also possible to mitigate pulsation in the voltage outputted by the first switching power source circuit 11 when the voltage or current outputted from the second switching power source circuit 12 changes. Furthermore, it is also possible to mitigate pulsation in the voltage or current outputted from the second switching power source circuit 12 when the voltage or current outputted from the second switching power source circuit 12 changes. Thus, it is possible to speed up the rising and falling of the voltage or current outputted from the second switching power source circuit 12, thereby making the waveform closer in shape to the ideal waveform.

(2) Meanwhile, if the control gain G1 is high in periods other than the periods P1 and P2 shown in FIG. 3, then the voltage outputted from the first switching power source circuit 11 may undergo large pulsation in synchronization with the PWM signal S1, or other effects such as vibration occur due to disturbance or the like. However, in the embodiment of the present invention, the control gain G1 is low at a constant Gc1 during periods other than the periods P1 and P2, and thus, it is possible to mitigate pulsation in the voltage outputted by the first switching power source circuit 11.

(3) The quantities of increase Δ1 and Δ2 and the periods of increase P1 and P2 are determined by experiment, simulation, or the like, and thus, the pulsation in the voltage outputted by the first switching power source circuit 11 can be minimized, and the waveform for the voltage or current outputted from the second switching power source circuit 12 can be made closer in shape to the ideal waveform.

MODIFICATION EXAMPLES

An embodiment of the present invention was described above. Various modifications can be made to the embodiment without departing from the spirit of the present invention. A few modification examples will be described below. The modification examples below may be combined.

Modification Example 1

In the embodiment above, there was one second switching power source circuit 12 and one load 2, but there may be a plurality of second switching power source circuits 12 and loads 2. In such a case, the output terminals of the plurality of second switching power source circuits 12 are connected to the respective plurality of loads 2, and any of the input terminals of the second switching power source circuits 12 is connected to the output terminal of the first switching power source circuit 11. The loads 2 may be of the same type or different types. The second switching power source circuits 12 may be of the same type or different types. In a manner similar to that shown in FIG. 2, the arithmetic processing unit 13 performs the process of determining the duty ratio of the PWM signal S1 for the first switching power source circuit 11 and then performs the process of determining the duty ratio of the PWM signal S2 for each second switching power source circuit 12. The arithmetic processing unit 13 sequentially and repeatedly performs these determining processes. Also, the memory 14 has stored therein target values C2 and control gains G2 for each second switching power source circuit 12. The target values C2 of the second switching power source circuit may be equal to the constant K2 or different therefrom. The period P of the data array of the target value C2 is equal for all second switching power source circuits 12. The period during which the target value C2 is equal to the constant K2 may differ for each second switching power source circuit 12 or be the same for all second switching power source circuits 12. The period during which the target value C2 is the constant K2 may be synchronized for all the second switching power source circuits 12 or not synchronized. When the target value C2 of any of the second switching power source circuits 12 changes, the control gain G1 is greater than the constant Gc1.

Modification Example 2

In the embodiment above, digital control circuits (arithmetic processing unit 13 and memory 14) were used to digitally control the switching power source circuits 11 and 12. However, analog control circuits may be used instead of the arithmetic processing unit 13 and the memory 14 so as to perform analog control of the switching power source circuits 11 and 12.

Embodiment 2

Figure 4:
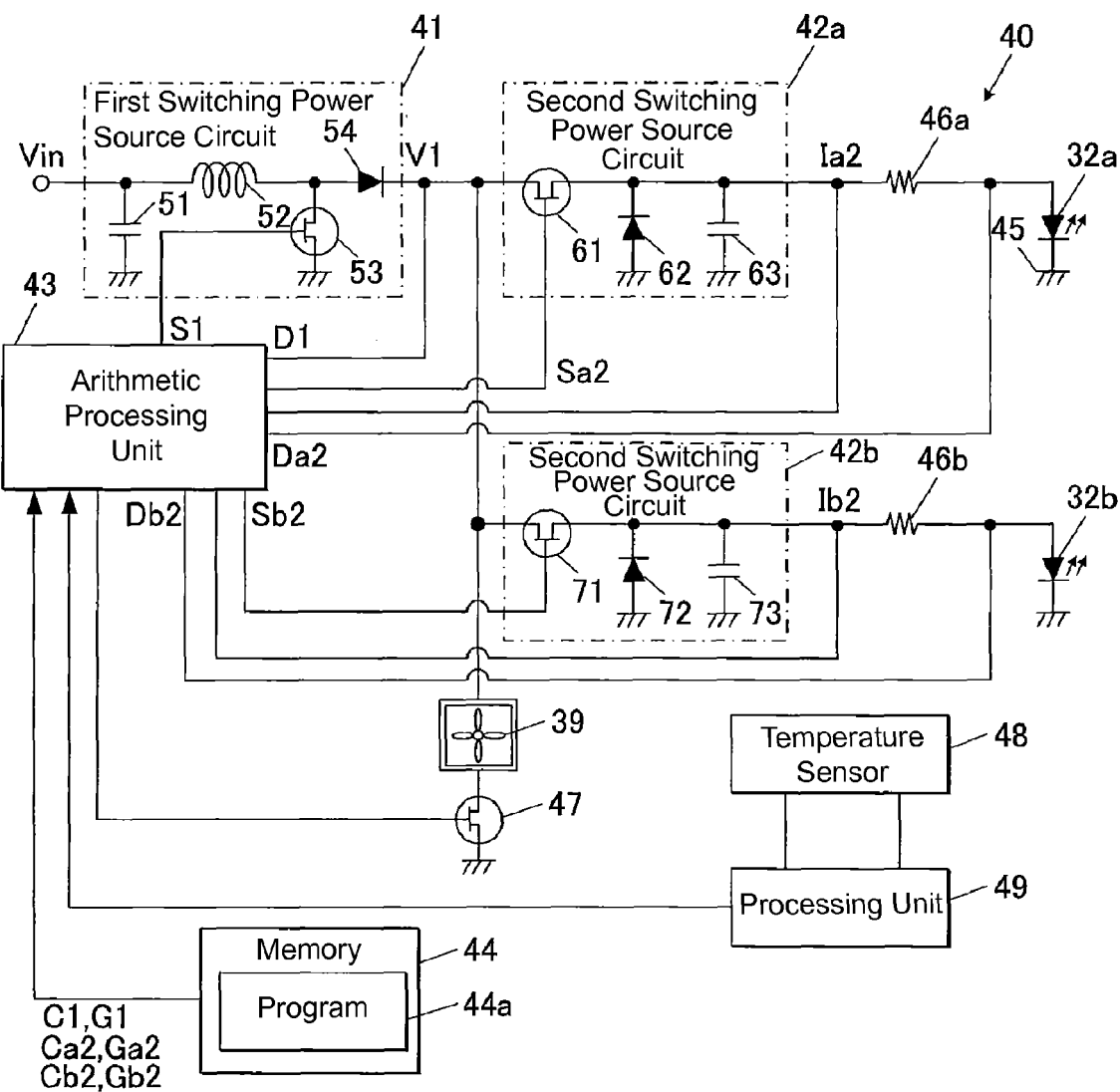
FIG. 4 is a block diagram of a driving device according to Embodiment 2 of the present invention.

FIG. 4 is a block diagram of a driving device 40 for light-emitting elements 32a and 32b and a cooling unit 39.

The driving device 40 drives the light-emitting elements 32a and 32b. Specifically, the driving device 40 causes the light-emitting elements 32a and 32b to blink. The light-emitting elements 32a and 32b blink at a speed high enough that it cannot be perceived by the naked eye. The period by which the light-emitting element 32a blinks (period of one instance of turning ON and one instance of turning OFF) is equal to the period by which the light-emitting element 32b blinks. The light-emitting element 32a is a laser diode and the light-emitting element 32b is a light-emitting diode. The cooling unit 39 is a fan or a Peltier element. The cooling unit 39 cools the light-emitting elements 32a and 32b.

The driving device 40 includes a first switching power source circuit 41, second switching power source circuits 42a and 42b, an arithmetic processing unit 43 (control unit), a memory 44 (storage medium), a switching element 47, a temperature sensor 48, a processing unit 49, and the like. A device including the driving device 40 and the light-emitting elements 32a and 32b is a light-emitting device.

The temperature sensor 48 detects a temperature external to the driving device 40 by converting the temperature external to the driving device 40 into an electrical signal. More specifically, the temperature sensor 48 is disposed on or close to the light-emitting elements 32a and 32b and converts the temperature of the light-emitting elements 32a and 32b into an electrical signal. The electrical signal representing the temperature detected by the temperature sensor 48 is outputted to the processing unit 49. The calculating device 43 and the processing unit 49 are processors such as a microcomputer or a digital signal processor (DSP).

The processing unit 49 monitors the output from the temperature sensor 48 and functions as a comparator of a digital circuit. Specifically, the processing unit 49 compares the temperature detected by the temperature sensor 48 to a prescribed threshold, and outputs a signal representing the result of this comparison to the arithmetic processing unit 43. If the temperature detected by the temperature sensor 48 exceeds the threshold, the signal outputted from the processing unit 49 to the arithmetic processing unit 43 is at a high level, and if the temperature detected by the temperature sensor 48 is less than or equal to the threshold, the signal outputted from the processing unit 49 to the arithmetic processing unit 43 is at a low level. A comparison circuit as an analog circuit may be used instead of the processing unit 49.

The memory 44 is a non-volatile memory. The memory 44 stores target values C1, Ca2, and Cb2, and control gains G1, Ga2, and Gb2. Details of the target values C1, Ca2, and Cb2, and the control gains G1, Ga2, and Cb2 will be described below.

The input terminal of the first switching power source circuit 41 is the input terminal of the driving device 40, and a constant voltage Vin is applied to the input terminal. The output terminal of the first switching power source circuit 41 is connected to the input terminals of the second switching power source circuit 42 and 42b, the output terminal of the second switching power source circuit 42a is connected to the positive pole (anode) of the light-emitting element 32a through a resistor 46a, and the output terminal of the second switching power source circuit 42b is connected to the positive pole of the light-emitting element 32b through the resistor 46b. The negative poles (cathode) of the light-emitting elements 32a and 32b are connected to a reference potential node 45 (ground). Also, the cooling unit and the switching element 47 are connected in series between the output terminal of the first switching power source circuit 41 and the reference potential node 45.

The first switching power source circuit 41 is a DC-DC converter (switching regulator) of the direct current output type, the constant voltage output type, and the voltage step up type. The first switching power source circuit 41 has a capacitor 51, an inductor 52, a switching element 53 (transistor), and a rectifying element 54. A capacitor 51 and an inductor 52 are connected in series between the reference potential node 45 and the positive pole of the rectifying element 54, and the connecting portion of the capacitor 51 and the inductor 52 is the input terminal of the first switching power source circuit 41. A switching element 53 is connected between the positive pole of the rectifying element 54 and the reference potential node 45. The negative pole of the rectifying element 54 is the output terminal of the first switching power source circuit 41.

The second switching power source circuits 42a and 42b are DC-DC converters (switching regulators) of the direct current output type, the constant current output type, and the step down type. The second switching power source circuit 42a has a switching element 61 (transistor), a rectifying element 62, and a capacitor 63. The positive pole of the rectifying element 62 is connected to the reference potential node 45. The switching element 61 is connected between the negative pole of the rectifying element 62 and the negative pole of the rectifying element 54 of the first switching power source circuit 41. The negative pole of the rectifying element 62 is connected to one electrode of the capacitor 63, and the negative pole of the rectifying element 62 and one electrode of the capacitor 63 are the output terminal of the second switching power source circuit 42a. The other electrode of the capacitor 63 is connected to the reference potential node 45. An inductor may be connected between the negative pole of the rectifying element 62 and the one electrode of the capacitor 63.

The second switching power source circuit 42b has a switching element 71 (transistor), a rectifying element 72, and a capacitor 73. The positive pole of the rectifying element 72 is connected to the reference potential node 45. The switching element 71 is connected between the negative pole of the rectifying element 72 and the negative pole of the rectifying element 54 of the first switching power source circuit 41. The negative pole of the rectifying element 72 is connected to one electrode of the capacitor 73, and the negative pole of the rectifying element 72 and one electrode of the capacitor 73 are the output terminal of the second switching power source circuit 42b. The other electrode of the capacitor 73 is connected to the reference potential node 45. An inductor may be connected between the negative pole of the rectifying element 72 and the one electrode of the capacitor 73.

The arithmetic processing unit 43 outputs a PWM signal S1 having a constant period to the switching element 53 (in particular, the gate or the base), and the switching element 53 turns ON or OFF according to the PWM signal S1. The current flowing from the input terminal of the first switching power source circuit 41 to the reference potential node 45 through the inductor 52 and the switching element 53 is turned ON or OFF by the switching element 53, and thus, direct current power of the voltage Vin is converted to direct current power of the voltage V1. The voltage V1 outputted by the first switching power source circuit 41 is returned to the arithmetic processing unit 43 as a detected value D1.

The arithmetic processing unit 43 outputs a PWM signal Sa2 having a constant period to the switching element 61 (in particular, the gate or the base), and the switching element 61 turns ON or OFF according to the PWM signal Sa2. The current flowing from the input terminal of the second switching power source circuit 42a to the output terminal of the second switching power source circuit 42a through the switching element 61 is turned ON or OFF by the switching element 61, and thus, direct current power of the voltage V1 is converted to direct current power of a current Ia2. The current Ia2 outputted by the second switching power source circuit 42a returns to the arithmetic processing unit 43 as a detected value Da2. Here, the current Ia2 outputted by the second switching power source circuit 42a is converted to a voltage of the resistor 46a.

The arithmetic processing unit 43 outputs a PWM signal Sb2 having a constant period to the switching element 71 (in particular, the gate or the base), and the switching element 71 turns ON or OFF according to the PWM signal Sb2. The current flowing from the input terminal of the second switching power source circuit 42b to the output terminal of the second switching power source circuit 42b through the switching element 71 is turned ON or OFF by the switching element 71, and thus, direct current power of the voltage V1 is converted to direct current power of a current Ib2. The current Ib2 outputted by the second switching power source circuit 42b returns to the arithmetic processing unit 43 as a detected value Db2. Here, the current Ib2 outputted by the second switching power source circuit 42b is converted to a voltage of the resistor 46b.

Figure 5:
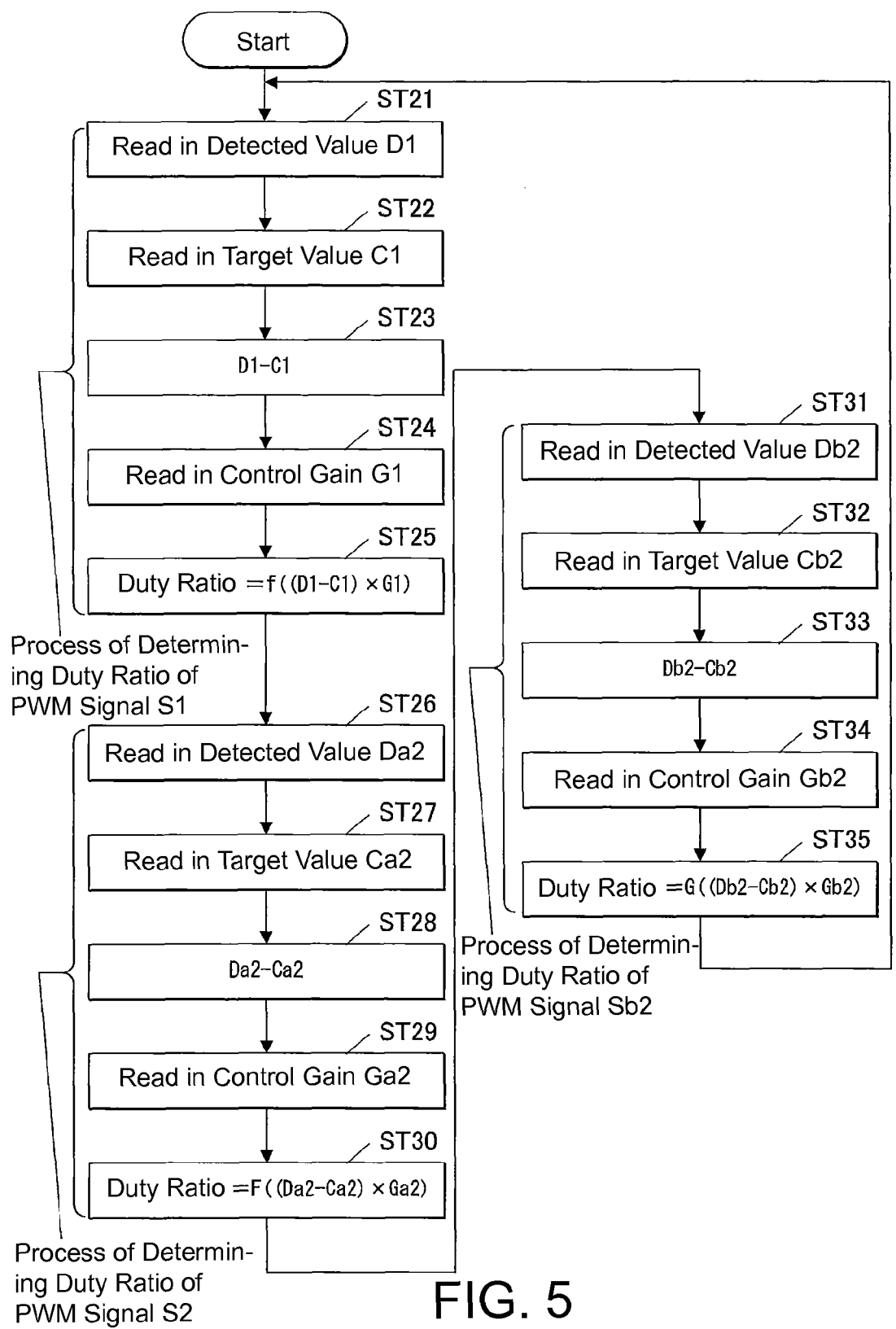
FIG. 5 is a chart showing a process flow in an arithmetic processing unit according to the same embodiment.

The duty ratio (pulse width) of the PWM signals S1, Sa2, and Sb2 is determined by the arithmetic processing unit 43 every period of the PWM signals S1, Sa2, and Sb2. In other words, the arithmetic processing unit 43 sequentially and repeatedly performs a process of determining a duty ratio of the PWM signal S1, a process of determining a duty ratio of the PWM signal Sa2, and a process of determining a duty ratio of the PWM signal Sb2 (refer to FIG. 5). FIG. 5 shows a process flow performed by the arithmetic processing unit 43 according to a program 44a stored in the memory 44. In the step ST21, the arithmetic processing unit 43 reads in the voltage V1 outputted from the first switching power source circuit 41 as the detected value D1. Next, in step ST22, the arithmetic processing unit 43 reads in the target value C1 from the memory 44. Next, in step ST23, the arithmetic processing unit 43 calculates the difference between the detected value D1 and the target value C1. Next, in step ST24, the arithmetic processing unit 43 reads in the control gain G1 from the memory 44. Next, in step ST25, the arithmetic processing unit 43 calculates the duty ratio based on the value resulting from multiplying the difference by the control gain G1, and outputs the PWM signal S1 of this duty ratio to the switching element 53 of the first switching power source circuit 41. The "f" shown in FIG. 5 represents a function for determining the duty ratio based on the value obtained by multiplying the difference by the control gain G1. Next, in step ST26, the arithmetic processing unit 43 reads in the current Ia2 outputted by the second switching power source circuit 42a as the detected value Da2. Next, in step ST27, the arithmetic processing unit 43 reads in the target value Ca2 from the memory 44. Next, in step ST28, the arithmetic processing unit 43 calculates the difference between the detected value Da2 and the target value Ca2. Next, in step ST29, the arithmetic processing unit 43 reads in the control gain Ga2 from the memory 44. Next, in step ST30, the arithmetic processing unit 43 calculates the duty ratio based on the value resulting from multiplying the difference by the control gain Ga2, and outputs the PWM signal Sa2 of this duty ratio to the switching element 61 of the second switching power source circuit 42a. The "F" shown in FIG. 5 represents a function for determining the duty ratio based on the value obtained by multiplying the difference by the control gain Ga2. Next, in step ST31, the arithmetic processing unit 43 reads in the current Ib2 outputted by the second switching power source circuit 42b as the detected value Db2. Next, in step ST32, the arithmetic processing unit 43 reads in the target value Cb2 from the memory 44. Next, in step ST33, the arithmetic processing unit 43 calculates the difference between the detected value Db2 and the target value Cb2. Next, in step ST34, the arithmetic processing unit 43 reads in the control gain Gb2 from the memory 44. Next, in step ST35, the arithmetic processing unit 43 calculates the duty ratio based on the value resulting from multiplying the difference by the control gain Gb2, and outputs the PWM signal Sb2 of this duty ratio to the switching element 71 of the second switching power source circuit 42b. The "G" shown in FIG. 5 represents a function for determining the duty ratio based on the value obtained by multiplying the difference by the control gain Gb2. Then, the process flow of the arithmetic processing unit 43 returns to the step ST21. During one period of the PWM signals S1, Sa2, and Sb2, the above-mentioned steps ST21 to ST35 are performed once, and by the steps ST21 to ST35 being repeated, the PWM signals S1, Sa2, and Sb2 are continuously outputted, which allows for feedback control of the switching power source circuits 41, 42a, and 42b.

Figure 6:
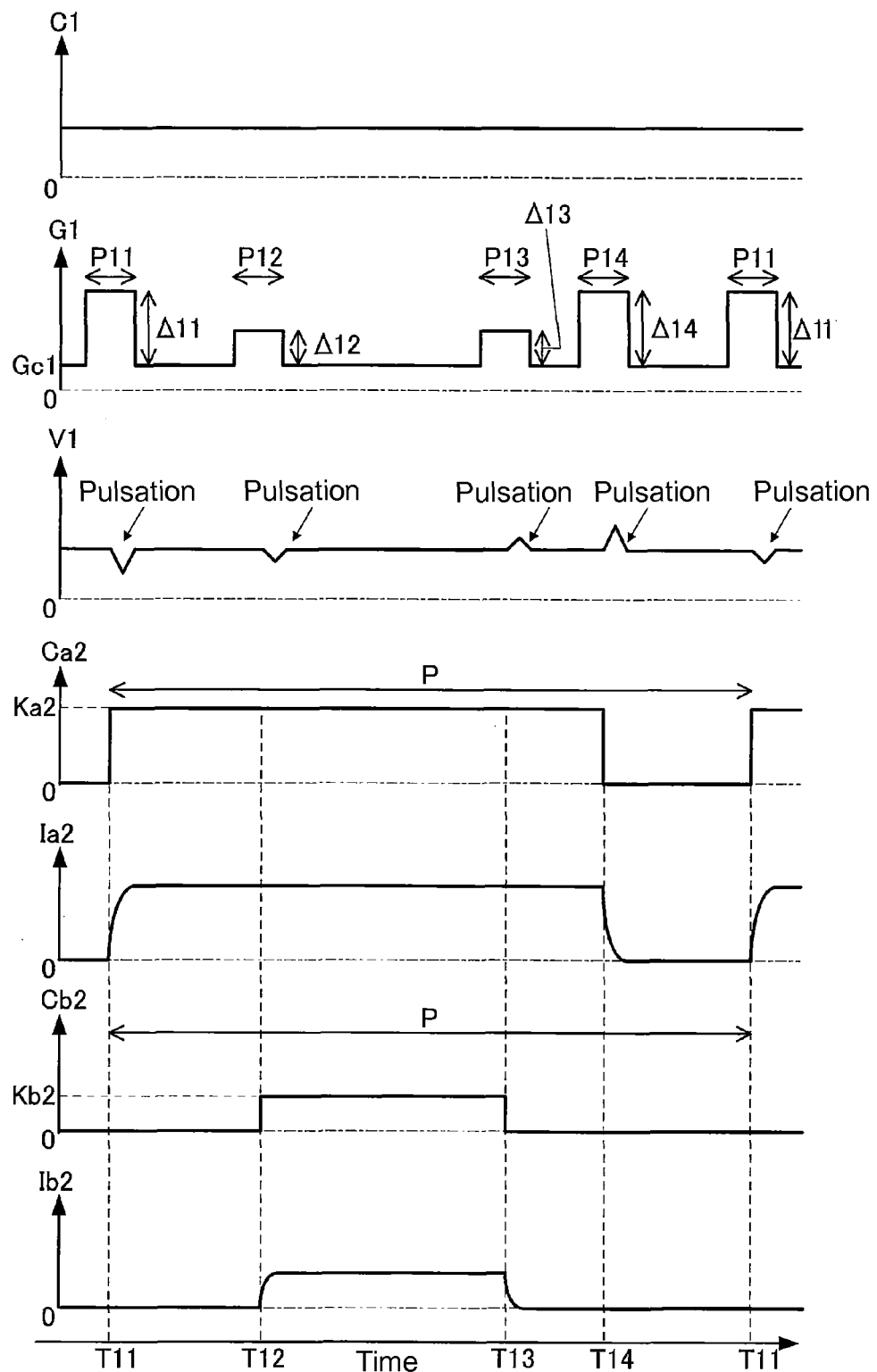
FIG. 6 is a chart that shows in chronological order a data structure of a target value and control gain stored in a storage medium according to the same embodiment, and that shows a change in output resulting from feedback control.

The target values C1, Ca2, and Cb2, and the control gain G1 stored in the memory 44 will be described with reference to FIG. 6. FIG. 6 shows timing charts showing the data structure of the target values C1, Ca2, and Cb2, and the control gain G1 stored in the memory 44 in chronological order, and showing the change in voltage V1, currents Ia2 and Ia2 resulting from feedback control.

The data structure of the target value C1 is similar to the data structure of the target value C1 described in Embodiment 1, and thus, description of the data structure of the target value C1 will be omitted. The process of step ST22 in FIG. 5 is performed repeatedly in order of addresses of the data array (in chronological order) of the target value C1, and thus, the data array of the target value C1 is read in in order of address (chronological order). Thus, the voltage V1 outputted from the first switching power source circuit 41 is maintained at a constant value.

The data structures of the target values Ca2 and Cb2 are data arrays such as pulses that periodically change, similar to the target value C2 described in Embodiment 1. The data array of the target value Ca2 includes a data array arranged in chronological order as data of a constant K2a (Ka2≠0) and a data array that includes zero as data in chronological order. The data array of the target value Cb2 includes the data array in which a constant Kb2 (Kb2≠0) is arranged in chronological order and a data array that includes zero as data in chronological order. A period P of the data array of the target value Ca2 is equal to a period P of the data array of the target value Cb2. The period of the data array of the target value Ca2 and the period during which the target value Ca2 is at the constant Ka2 is longer than the period during which the target value Cb2 is at the constant Kb2, and the entire period during which the target value Cb2 is at the constant Kb2 overlaps (is included) in time the period during which the target value Ca2 is at the constant Ka2.

The process of step ST27 in FIG. 5 is performed repeatedly in order of addresses of the data array (in chronological order) of the target value Ca2, and thus, the data array of the target value Ca2 is read in in order of address (chronological order). Thus, during the period when the target value Ca2 is at the constant Ka2, the current Ia2 outputted from the second switching power source circuit 42a is maintained at a constant value, and the light-emitting element 32a is illuminated. When the target value Ca2 is at zero, the current Ia2 outputted from the second switching power source circuit 42a is maintained at zero, and the light-emitting element 32a is turned off.

Similarly, the process of step ST29 in FIG. 5 is performed repeatedly in order of addresses of the data array (in chronological order) of the target value Cb2, and thus, the data array of the target value Cb2 is read in in order of address (chronological order). Thus, during the period when the target value Cb2 is at the constant Kb2, the current Ib2 outputted from the second switching power source circuit 42b is maintained at a constant value, and the light-emitting element 32b is illuminated. When the target value Cb2 is at zero, the current Ib2 outputted from the second switching power source circuit 42b is maintained at zero, and the light-emitting element 32b is turned off.

The data structure of the control gain G1 includes a data array in which a plurality of data are arranged in chronological order, and the data array is stored in the memory 44 in order of address, and the addresses in the memory 44 correspond to time. The control gain G1 rises from the constant Gc1 simultaneously or immediately prior to a time T11 when the target value Ca2 rises from zero to the constant Ka2, the control gain G1 falls to the constant Gc1 after the time T11 when the target value Ca2 rises from zero to the constant Ka2, and during the period P11 therebetween, the data of the control gain G1 is set higher than the constant Gc1. Also, the control gain G1 rises from the constant Gc1 simultaneously or immediately prior to a time T12 when the target value Cb2 rises from zero to the constant Kb2, the control gain G1 falls to the constant Gc1 after the time T12 when the target value Cb2 rises from zero to the constant Kb2, and during the period P12 therebetween, the data of the control gain G1 is set higher than the constant Gc1. The control gain G1 rises from the constant Gc1 simultaneously or immediately prior to a time T13 when the target value Cb2 falls from the constant Kb2 to zero, the control gain G1 falls to the constant Gc1 after the time T13 when the target value Cb2 falls from the constant Kb2 to zero, and during the period P13 therebetween, the data of the control gain G1 is set higher than the constant Gc1. The control gain G1 rises from the constant Gc1 simultaneously or immediately prior to a time T14 when the target value Ca2 falls from the constant Ka2 to zero, the control gain G1 falls to the constant Gc1 after the time T14 when the target value Ca2 falls from the constant Ka2 to zero, and during the period P14 therebetween, the data of the control gain G1 is set higher than the constant Gc1. In other words, besides when the target values Ca2 and Cb2 and the currents Ia2 and Ib2 change, the data of the control gain G1 is set to the constant Gc1, and when the target values Ca2 and Cb2 and the currents Ia2 and Ib2 change, the data of the control gain G1 is set higher than the constant Gc1.

The quantities of increase $\Delta 11$, $\Delta 12$, $\Delta 13$, and $\Delta 14$ and the periods of increase P11, P12, P13, and P14 when the target values Ca2 and Cb2 and the currents Ia2 and Ib2 change are determined in advance by experiment, simulation, or the like. The quantities of increase $\Delta 11$, $\Delta 12$, $\Delta 13$, and $\Delta 14$ are equal to or different from each other. The periods of increase P11, P12, P13, and P14 are equal to or different from each other.

In general, if the change in current is large, the pulsation is also large, and thus, as shown in FIG. 6, when Ka1 is larger than Kb2, the quantity of change $\Delta 11$ is set at a value larger than $\Delta 12$, and $\Delta 13$ is set at a value smaller than $\Delta 14$.

The process of step ST24 in FIG. 5 is performed repeatedly in order of addresses of the data array (in chronological order) of the control gain G1, and thus, the data array of the control gain G1 is read in in order of address (chronological order). Thus, as the arithmetic processing unit 43 repeatedly performs the steps in order as shown in FIG. 5, when the target values Ca2 and Cb2 and the currents Ia2 and Ib2 change, the arithmetic processing unit 43 increases the control gain G1.

Feedback control may be performed on the quantity of increase $\Delta 11$ and the period of increase P11. In other words, the arithmetic processing unit 43 may determine the quantity of increase $\Delta 11$ and/or the period of increase P12 based on the difference between the detected value D1 and the target value C1, and increase the control gain G1 in the period of increase P11 from the constant Gc1 by the quantity of increase $\Delta 11$ when the target value Ca2 rises. This similarly applies to the quantity of increase $\Delta 12$ and the period of increase P12, the quantity of increase $\Delta 13$ and the period of increase P13, and the quantity of increase $\Delta 14$ and the period of increase P14.

If the temperature detected by the temperature sensor 48 exceeds a prescribed threshold as the arithmetic processing unit 43 repeatedly executes the steps shown in FIG. 5, the signal outputted from the processing unit 49 to the arithmetic processing unit 43 changes. The arithmetic processing unit 43 detects when the temperature detected by the temperature sensor 48 exceeds the threshold as an interrupting step. In such a case, during the step ST24, the arithmetic processing unit 43 reads in data greater than the constant Gc1 as the control gain G1 from the memory 44 instead of reading in the data of the data array shown in FIG. 6 as the control gain G1. Here, data of a greater value than the constant Gc1 is stored in the memory 44. Alternatively, a value greater than the constant Gc1 may be calculated and read in by the arithmetic processing unit 43 as the control gain G1 when the temperature detected by the temperature sensor 48 exceeds the threshold.

The arithmetic processing unit 43 repeatedly executes the steps of FIG. 5 (however, in any instance of the step ST24 being executed, data of a value greater than the constant Gc1 is read in as the control gain G1). If the arithmetic processing unit 43, which is executing these processes, detects that the temperature detected by the temperature sensor 48 exceeds the prescribed threshold, or the opposite phenomenon is observed, then an interrupting process is executed. In the interrupting process, the arithmetic processing unit 43 causes the switching element 47 to switch from ON to OFF or from OFF to ON. Specifically, if the signal outputted from the processing unit 49 to the arithmetic processing unit 43 changes from a low level to a high level, the arithmetic processing unit 43 causes the switching element 47 to which from OFF to ON, causing the cooling unit 39 to operate. If the signal outputted from the processing unit 49 to the arithmetic processing unit 43 changes from a high level to a low level, the arithmetic processing unit 43 causes the switching element 47 to switch from ON to OFF, causing the cooling unit 39 to stop.

Immediately after the interrupting process, the arithmetic processing unit 43 repeatedly executes the steps shown in FIG. 5 for a fixed period (however, in any instance of the step ST24 being executed, data having a value greater than the constant GC1 related to the operation of the cooling unit 39 is read in as the control gain G1). Then, after a certain period of time until the effects of the operation of the cooling unit 39 end, the arithmetic processing unit 43 returns the control gain G1 to data of the data array shown in FIG. 6, and repeatedly executes the steps of FIG. 5 (in the step ST24, the data of the data array shown in FIG. 6 is read in as the control gain G1).

As a result of the arithmetic processing unit 43 executing the steps above, the control gain G1 is greater than the constant Gc1 even outside of the times T11, T12, T13, and T14 when the target values Ca2 and Cb2 and the currents Ia2 and Ib2 change. In other words, the control gain G1 is greater than the constant Gc1 during a certain period when (or after) the temperature of the driving device 40 rises and the cooling unit 39 operates. Even during (after) the certain period when the cooling unit 39 is stopped, the control gain G1 is made greater than the constant Gc1.

If the actual start/stop of the cooling unit 39 from when the temperature above the threshold is detected is delayed, then the control gain G1 can be raised even during the prescribed delay time immediately prior to start/stop, and not only immediately after start/stop.

According to Embodiment 2, effects similar to those described in Embodiment 1 can be attained, and in addition, the following effects can be attained.

(1) The control gain G1 when the cooling unit 39 is started or stopped can be raised, and thus, pulsation in the voltage outputted by the first switching power source circuit 41 can be mitigated, the effect of starting or stopping the cooling unit 39 on the output from the second switching power source circuits 42a and 42b can be minimized, and the pulsation in the first switching power source circuit 41 can be mitigated. Thus, it is possible to make the waveform of the output from the second switching power source circuits 42a and 42b closer in shape to the ideal waveform.

MODIFICATION EXAMPLES

An embodiment of the present invention was described above. Various modifications can be made to Embodiment 2 without departing from the spirit of the present invention. A few modification examples will be described below. The modification examples below may be combined.

Modification Example 1

The phase of the data array of the target value Cb2 may be offset such that the period when the target value Cb2 is zero overlaps in time with the period in which the target value Ca2 is equal to the constant Ka2, and such that the period when the target value Ca2 is zero overlaps in time with the period when the target value Cb2 is equal to the constant Kb2. In such a case, the periods P12 and P14 when the control gain G1 increases as the target value Cb2 and the current Ib2 change is offset by an amount equal to the offset of the data array of the target value Cb2. Thus, when the target values Ca2 and Cb2 and the currents Ia2 and Ib2 change, the control gain G1 is raised from the constant Gc1.

Modification Example 2

The number of second switching power source circuits connected to the output terminal of the first switching power source circuit 41 may be three or more, and a plurality of light-emitting elements may respectively be connected to the output terminals of the second switching power source circuits.

Figure 7:
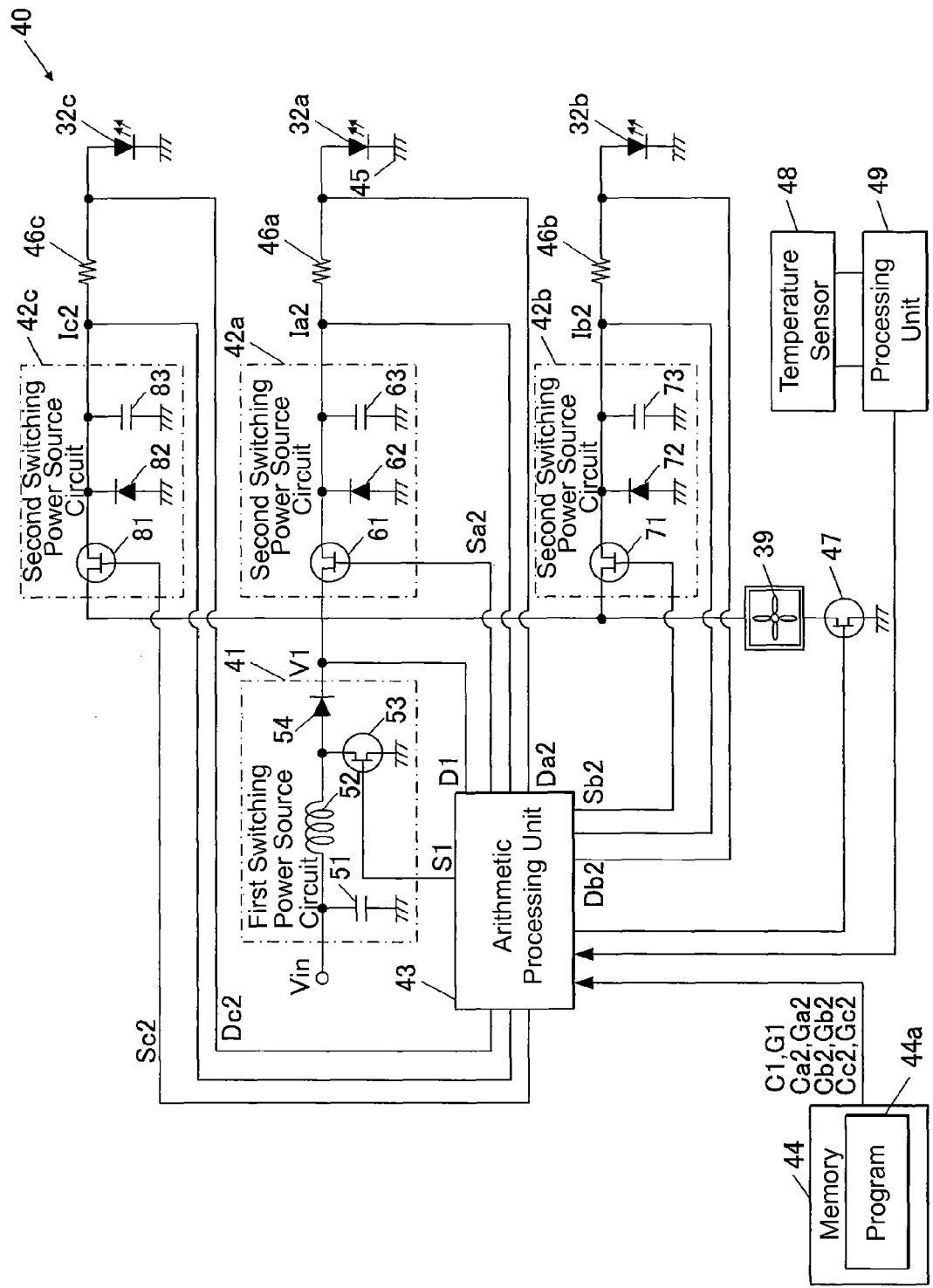
FIG. 7 is a block diagram of a driving device according to a modification example of the same embodiment.

For example, as shown in FIG. 7, an input terminal of a second switching power source circuit 42c is connected to the output terminal of the first switching power source circuit 41 in addition to the second switching power source circuits 42a and 42b, the positive pole of the light-emitting element 32c is connected to the output terminal of the second switching power source circuit 42c, and the negative pole of the light-emitting element 32c is connected to the reference potential node 45.

The second switching power source circuit 42c has a configuration similar to the second switching power source circuits 42a and 42b. The reference characters 81, 82, and 83 are respectively assigned to the switching element, the rectifying element, and the capacitor of the second switching power source circuit 42c. Also, the reference character 46c is assigned to a resistor. The reference character Ic2 is assigned to a current outputted from the second switching power source circuit 42c, the reference character Sc2 is assigned to a PWM signal outputted to the switching element 81 by the arithmetic processing unit 43, the reference character Dc2 is assigned to a detected value of the current Ic2, the reference character Cc2 is assigned to a target value read in by the arithmetic processing unit 43, and the reference character Gc2 is assigned to a control gain read in by the arithmetic processing unit 43.

Figure 8:
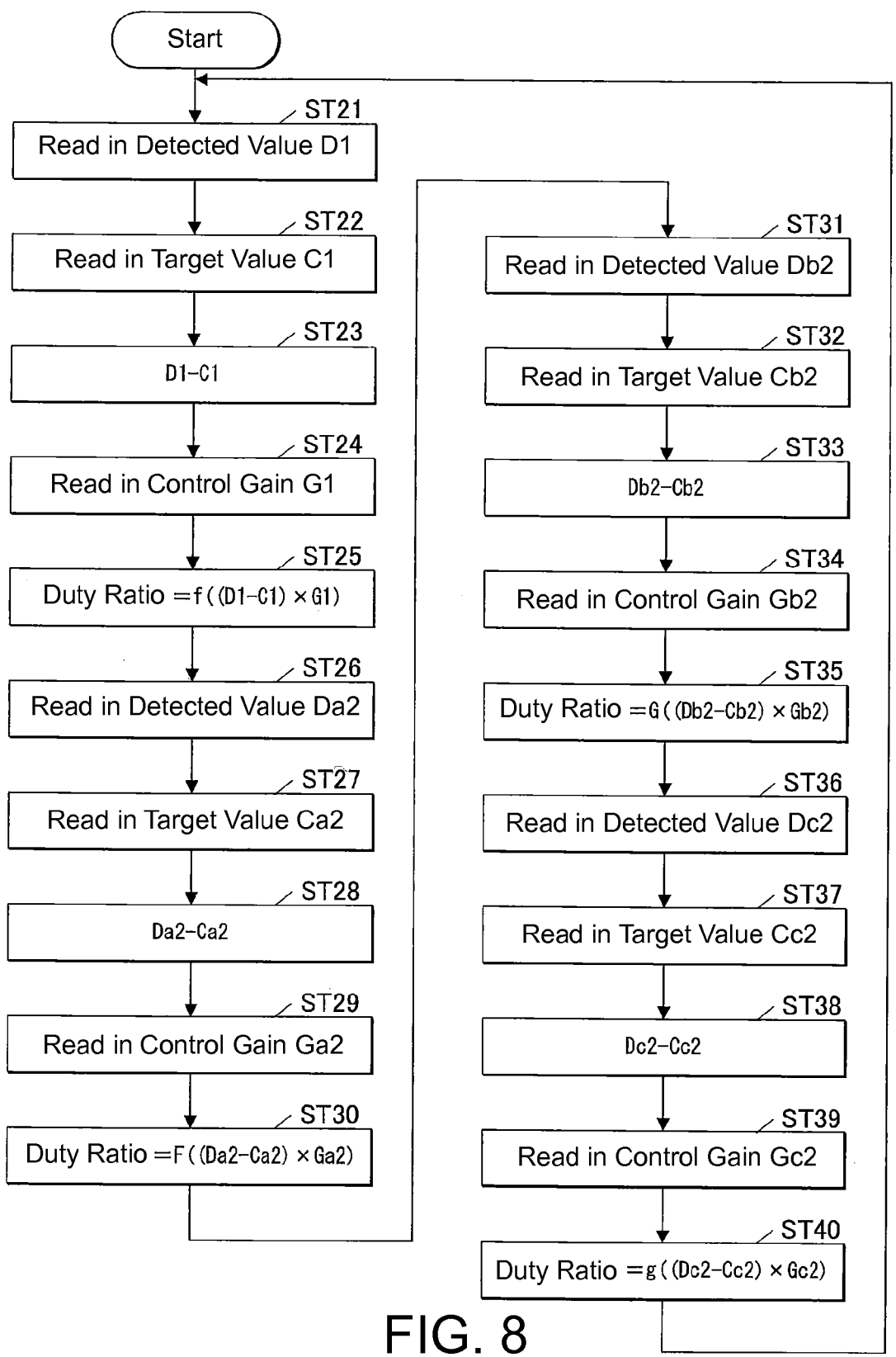
FIG. 8 is a chart showing a process flow in an arithmetic processing unit according to the same modification example.

The detected value Dc2, the target value Cc2, and the control gain Gc2 are used when determining the duty ratio of the PWM signal Sc2. In other words, the arithmetic processing unit 43 conducts process of determining the duty ratio of the PWM signal Sc2 as shown in FIG. 8 (steps ST36 to ST40) following the process of determining the duty ratio of the PWM signal Sb2 shown in FIG. 5 (steps ST31 to ST35). The arithmetic processing unit 43 repeatedly performs the process of determining the duty ratio of the PWM signal S1 (steps ST21 to ST25), the process of determining the duty ratio of the PWM signal Sa2 (steps ST26 to ST30), the process of determining the duty ratio of the PWM signal Sb2 (steps ST31 to ST35), and the process of determining the duty ratio of the PWM signal Sc2 (steps ST36 to ST40) (refer to FIG. 8). In step ST40 in FIG. 8, "g" represents a function.

Figure 9:
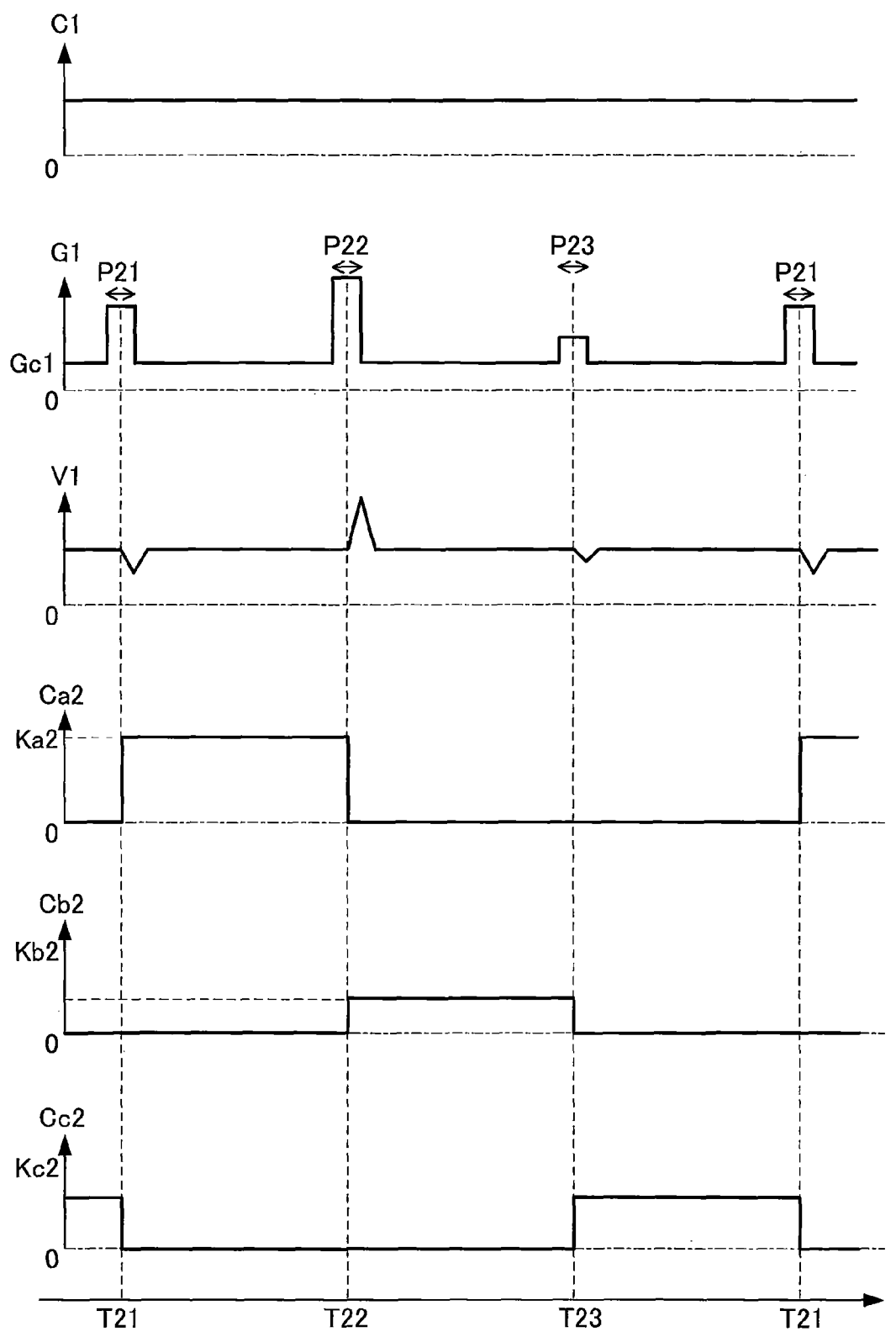
FIG. 9 is a chart that shows in chronological order a data structure of a target value and control gain stored in a storage medium according to the same embodiment, and that shows a change in output resulting from feedback control.

FIG. 9 shows a data structure of the target values C1, Ca2, Cb2, and Cc2, and the control gain G1 stored in the memory 44. As shown in FIG. 9, the data structure of both the target values C1, Ca2, Cb2, and Cc2 and the control gain G1 are data arrays in which a plurality of data are arranged in chronological order (in order of address). The data in the data array for the target value C1 are all equal.

The data arrays for the target values Ca2, Cb2, and Cc2 are data arrays for pulses that change periodically, and the period is the same for all of the data arrays. The period when the target value Ca2 is at the constant Ka2 (period from the time 21 to the time 22), the period when the target value Cb2 is at the constant Kb2 (period from the time 22 to the time 23), and the period when the target value Cc2 is at the constant Kc2 (Kc2≠0) (period from the time 23 to the time 21) are offset in time from each other. The target value Cc2 falls from the constant Kc2 to zero in synchronization with the target value Ca2 rising from zero to the constant Ka2 (refer to time T21). The target value Ca2 falls from the constant Ka2 to zero in synchronization with the target value Cb2 rising from zero to the constant Kb2 (refer to time T22). The target value Cb2 falls from the constant Kb2 to zero in synchronization with the target value Cc2 rising from zero to the constant Kc2 (refer to time T23).

The data in the data array for the control gain G1 in a period outside of the periods P21, P22, and P23 is set at the constant Gc1, and during the periods P21, P22, and P23, the data is set to zero. The period P21 is a period that straddles the time T21 when the target values Cc2 and Ca2 and the currents Ic2 and Ia2 change, the period P22 is a period that straddles the time T22 when the target values Ca2 and Cb2 and the currents Ia2 and Ib2 change, and the period P23 is a period that straddles the time T23 when the target values Cb2 and Cc2 and the currents Ib2 and Ic2 change. The periods P21, P22, and P23 are shorter than the period of the data arrays of the target values Ca2, Cb2, and Cc2. The period P21 may start at the time T21, the period P22 may start at the time T22, and period P23 may start at the time T23.

The process of step ST24 in FIG. 8 is performed repeatedly in order of addresses of the data array (in chronological order) of the control gain G1, and thus, the data array of the control gain G1 is read in in order of address (chronological order). Thus, when the target values Ca2, Cb2, and Cc2 and the currents Ia2, Ib2, and Ic2 change as the arithmetic processing unit 43 repeatedly performs the steps in order as shown in FIG. 8, the arithmetic processing unit 43 raises the control gain G1.

As shown in FIG. 9, the size of the pulsation is affected by the (difference in) changes, or in other words, the (difference in) wave height of the target values, and thus, it is preferable that the control gain G1 be set so as to be determined by the (difference in) wave height of the target values.

In the embodiments above, the voltages from the power source circuits (first switching power source circuit 11, first switching power source circuit 41) receive feedback control, but the currents may receive feedback control such that power of a constant current is outputted.

Embodiment 3

Figure 10:
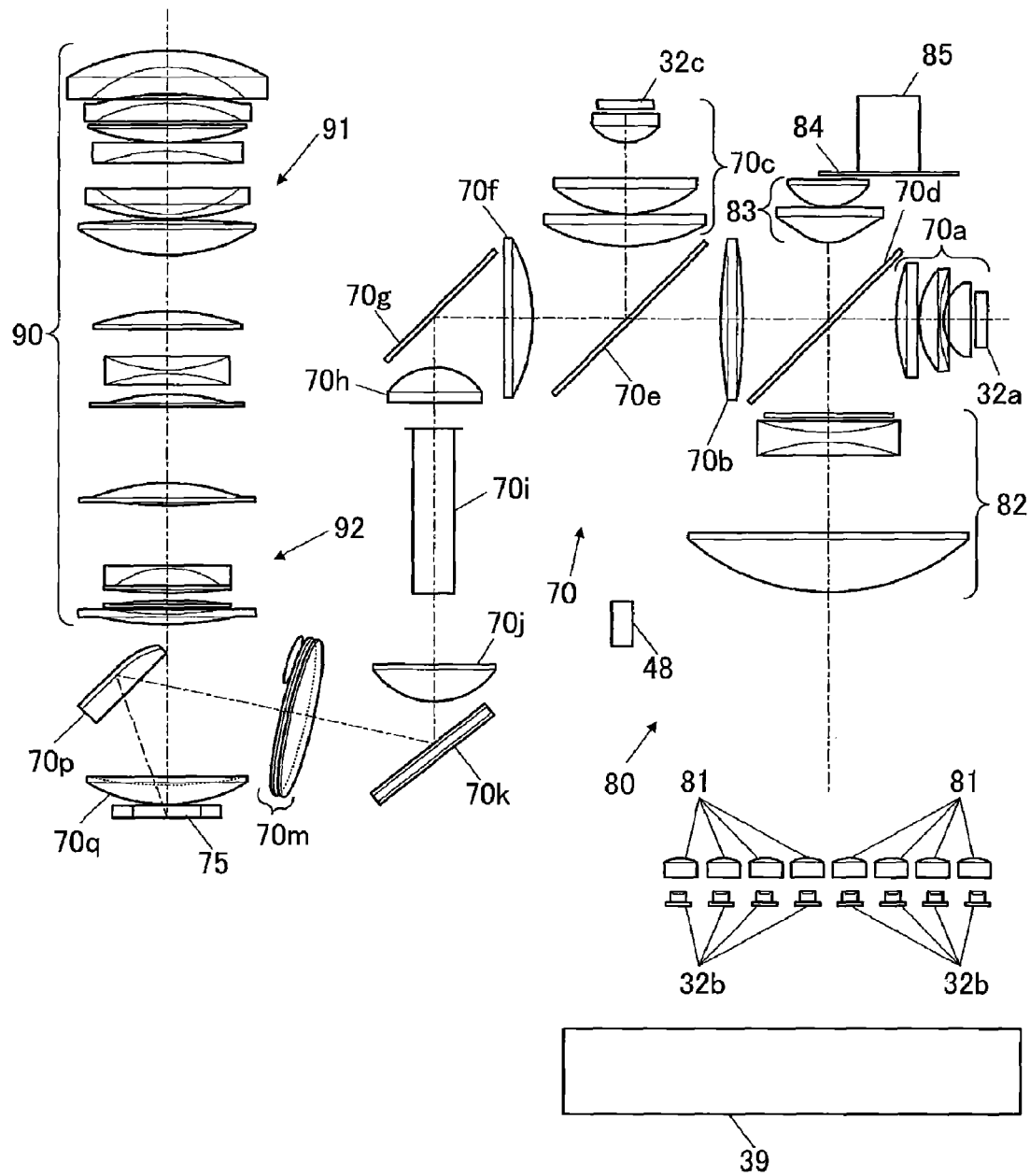
FIG. 10 is a plan view of an optical unit of a projection device according to Embodiment 3 of the present invention.

A projection device including the light-emitting device according to Modification Example 2 of Embodiment 2 will be described with reference to FIG. 10. FIG. 10 is a plan view of an optical unit of the projection device.

As shown in FIG. 10, the projection device, in addition to the light-emitting device, includes an excitation light/fluorescent light conversion device 80, an optical system 70, a display element 75, a projection lens unit 90, and the like.

The light-emitting element 32*a* is a blue light-emitting diode, and the light-emitting element 32*c* is a red light-emitting diode. They are disposed such that the optical axes of the light-emitting element 32*c* and the light-emitting element 32*a* are perpendicular to each other.

There are a plurality of light-emitting elements 32*b*. The light-emitting elements 32*b* are arranged in a two-dimensional array. The wavelength band of laser excitation light emitted by the light-emitting element 32*b* is in the blue waveband or the ultraviolet waveband, but is not limited thereto. The light-emitting element 32*b* is a laser diode that emits excitation light. The light-emitting element 32*b* and the light-emitting element 32*a* are disposed such that the optical axes thereof are perpendicular to each other.

The excitation light/fluorescent light conversion device 80 generates green fluorescent light from the excitation light emitted by the light-emitting element 32*b*. The excitation light/fluorescent light conversion device 80 has a plurality of collimator lenses 81, a group of lenses 82, a group of lenses 83, a fluorescent wheel 84, and a spindle motor 85. The collimator lenses 81 respectively face the light-emitting elements 32*b*, and laser excitation light emitted by the light-emitting elements 32*b* is collimated by the collimator lenses 81. The group of lenses 82 and the group of lenses 83 are disposed on the same optical axis. The group of lenses 82 and the group of lenses 83 are gather the beams of laser excitation light collimated by the collimator lenses 81 and condense them.

The fluorescent wheel 84 faces the surface in which the plurality of light-emitting elements 32*b* are arranged in the two-dimensional array. The group of lenses 82 and the group of lenses 83 are disposed between the fluorescent wheel 84 and the light-emitting elements 32*b*, and the optical axes of the group of lenses 82 and the group of lenses 83 are perpendicular to the fluorescent wheel 84. Also, the optical axes of the groups of lenses 82 and 83 are parallel to the optical axes of the light-emitting elements 32*b* and 32*c* and are perpendicular to the optical axis of the light-emitting element 32*a*.

The laser excitation light condensed by the group of lenses 82 and the group of lenses 83 is radiated to the fluorescent wheel 84. The fluorescent wheel 84 is formed by forming a green fluorescent body that emits green light when excited by the laser excitation light onto a mirrored wheel. Thus, as a result of the laser excitation light being radiated onto the green fluorescent body of the fluorescent wheel 84, the green fluorescent light emits green light. The fluorescent wheel 84 is connected to the spindle motor 85, and the fluorescent wheel 84 rotates as a result of the spindle motor 85.

The plurality of light-emitting elements 32*b* that generate excitation light may be changed to one light-emitting element 32*b* (light emitting diode) that emits green light. In such a case, it is possible to provide the light-emitting element 32*b* where the optical axes of the fluorescent wheel 84 and the group of lenses 83 intersect, and it is possible to omit the collimator lens 81 and the group of lenses 82.

Next, the optical system 70 will be described in detail. The optical system 70 radiates red light, green light, and blue light to the display element 75 by merging together the optical axis of the red light emitted by the light-emitting element 32*c*, the optical axis of the green light emitted by the fluorescent wheel 84, and the optical axis of the blue light emitted by the light-emitting element 32*a*. The optical system 70 has a group of lenses 70*a*, a lens 70*b*, a group of lenses 70*c*, a first dichroic mirror 70*d*, a second dichroic mirror 70*e*, a lens 70*f*, a reflective mirror 70*g*, a lens 70*h*, an integrator optical element 70*i*, a lens 70*j*, an optical axis conversion mirror 70*k*, a group of condensing lenses 70*m*, an illumination mirror 70*p*, and an illumination lens 70*q*.

The group of lenses 70*a* face the light-emitting element 32*a*. The group of lenses 70*a* and the lens 70*b* are disposed such that the optical axes thereof are aligned in one line. The optical axis of the group of lenses 70*a* and the lens 70*b* intersect perpendicularly with the optical axis of the group of lenses 82 and the group of lenses 83, between the group of lenses 82 and the group of lenses 83.

The first dichroic mirror 70*d* is disposed between the group of lenses 70*a* and the lens 70*b*, and between the group of lenses 82 and the group of lenses 83. The first dichroic mirror 70*d* is at a 45° angle with respect to the optical axis of the groups of lenses 82 and 83, and at a 45° angle with respect to the optical axis of the group of lenses 70*a* and the lens 70*b*. The first dichroic mirror 70*d* allows through excitation light of the wavelength band emitted by the light-emitting element 82*b* (blue excitation light, for example) so as to travel towards the fluorescent wheel 84, and allows through blue wavelength light emitted by the light-emitting element 32*a* so as to travel towards the second dichroic mirror 70*e*. The first dichroic mirror 70*d* reflects green wavelength light emitted by the fluorescent wheel 84 towards the second dichroic mirror 70*e*.

The group of lenses 70*c* face the light-emitting element 32*c*. The group of lenses 70*c* is disposed such that the optical axis thereof intersects perpendicularly with the optical axis of the group of lenses 70*a* and the lens 70*b*, the group of lenses 70*c* being on the side of the lens 70*b* opposite to the light-emitting element 32*a* and the first dichroic mirror 70*d*.

The second dichroic mirror 70*e* is disposed on the side of the group of lenses 70*c* opposite to the light-emitting element 32*c*, and is disposed on the side of the lens 70*b* opposite to the first dichroic mirror 70*d*. The second dichroic mirror 70*e* is at a 45° angle to the optical axis of the group of lenses 70*c*, and is at a 45° angle to the optical axis of the group of lenses 70*a* and the lens 70*b*. The second dichroic mirror 70*e* allows through blue and green wavelength light from the first dichroic mirror 70*d* so as to travel towards the lens 70*f*, and reflects red wavelength light emitted by the light-emitting element 32*c* towards the lens 70*f*.

The lens 70*f* is disposed on the side of the second dichroic mirror 70*e* opposite to the lens 70*b*. The lens 70*f* is disposed such that the optical axis thereof matches the optical axis of the lens 70*b* and the group of lenses 70*a*.

The lens 70*h*, the integrator optical element 70*i*, and the lens 70*j* are disposed such that optical axes thereof are all in one line. The lens 70*h*, the integrator optical element 70*i*, and the lens 70*j* have optical axes that intersect perpendicularly to the lens 70*f*, the lens 70*b*, and the group of lenses 70*a*.

The reflective mirror 70*g* is disposed in a portion where the optical axis of the lens 70*h* intersects with the optical axis of the lens 70*f*. The reflective mirror 70*g* is at a 45° angle to the optical axis of the lenses 70*f* and 70*b*, and the group of lenses 70*a*, and at a 45° angle to the optical axis of the lens 70*h*, the integrator optical element 70*i*, and the lens 70*j*. The red light, green light, and blue light are condensed by the lens 70*f* and the lens 70*h*, and reflected by the reflective mirror 70*g* towards the integrator optical element 70*i*.

The integrator optical element 70*i* is a light tunnel or a light rod. Light that has entered the light-receiving face of the integrator optical element 70*i* facing the lens 70*h* is guided within the integrator optical element 70*i* and emitted from the opposite end face. The integrator optical element 70*i* makes even the illuminance distribution of light emitted, along the surface intersecting perpendicularly with the optical axis of the emitted light.

The lens 70j emits the red light, green light, and blue light guided by the integrator optical element 70i towards the optical axis conversion mirror 70k and condenses the light. The optical axis conversion mirror 70k reflects the red light, green light, and blue light received from the lens 70j towards the group of condensing lenses 70m. The group of condensing lenses 70m radiate the red light, green light, and blue light reflected by the optical axis conversion mirror 70k towards the illumination mirror 70p and condenses this light. The illumination mirror 70p reflects the light received from the group of condensing lenses 70m towards the display element 75. The illumination lens 70q radiates the light reflected by the illumination mirror 70p towards the display element 75.

The display element 75 is a reflective spatial light modulator, and more specifically, is a digital micromirror device (DMD). The display element 75 may be a transmissive special light modulator (a liquid crystal shutter array panel; a so-called liquid crystal display device) instead of a reflective spatial light modulator. If the display element 75 is a transmissive spatial light modulator, the optical design of the optical system 70 is modified such that light is radiated to the display element 75 from the side opposite to the projection lens unit 90 (projection optical system).

The projection lens unit 90 is provided so as to face the display element 75, and the optical axis of the projection lens unit 90 extends in the front/rear direction and intersects with the display element 75 (specifically, perpendicularly). The projection lens unit 90 radiates light reflected by the display element 75 towards the front, thus projected images formed by the display element 75 onto a screen. The projection lens unit 90 includes a movable group of lenses 91, a fixed group of lenses 92, and the like. The projection lens unit 90 is configured such that the focus distance can be changed by movement of the movable group of lenses 91, thus allowing focusing.

The projection device shown in FIG. 10 may be applied to a rear projection display device. A rear projection display device includes a transmissive screen, and a projection device disposed on the rear of the transmissive screen and that projects images from the rear of the transmissive screen to the transmissive screen. The transmissive screen is not limited to being rectangular in shape, and may have the shape of a person, an animal, or another character.

Embodiments of the present invention were described above, but the technical scope of the present invention is not limited to the embodiments above, and is determined on the basis of the claims. Furthermore, equal configurations in which modifications unrelated to the gist of the present invention are added in addition to the claims are also included in the technical scope of the present invention.

In the embodiments described above, values of the control gains and their increased values are stored in a memory or the like. Alternatively, all or some of these values may be calculated by the control unit or a processor so that the values themselves need not be stored in a memory.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A driving device for driving a load, comprising:
   a power source circuit that converts power inputted thereto to a power of a constant voltage or a constant current, and then outputs said power that has been converted;
   a driver circuit that receives the power outputted by the power source circuit and outputs a power to the load; and
   a control unit performing feedback control on the power source circuit, the control unit receiving a voltage or a current of the power outputted by the power source circuit as a detected value, and outputting to the power source circuit a feedback signal based on a value obtained by multiplying a difference of the detected value and a constant target value by a control gain,
   wherein the control gain is increased when a voltage or a current of the power outputted from the driver circuit is to change.

2. The driving device according to claim 1, wherein an amount by which the control gain is increased is determined on the basis of pulsation that occurs in the voltage or the current outputted by the power source circuit when the voltage or the current of power outputted by the driver circuit is to change.

3. The driving device according to claim 1, wherein an amount by which the control gain is increased is determined on the basis of an amount of change in the voltage or the current outputted by the driver circuit when the voltage or the current of the power outputted by the driver circuit is to change.

4. The driving device according to claim 1, wherein a period during which the control gain is increased is determined on the basis of pulsation that occurs in the voltage or the current outputted by the power source circuit when the voltage or the current of power outputted by the driver circuit is to change.

5. The driving device according to claim 1, wherein a period during which the control gain is increased is determined on the basis of an amount of change in the voltage or the current outputted by the driver circuit when the voltage or the current of the power outputted by the driver circuit is to change.

6. The driving device according to claim 1, further comprising:
   a temperature detection unit that detects a temperature external to the driving device;
   a cooling unit connected to an output unit of the power source circuit; and
   a comparator that performs comparison of a temperature detected by the temperature detection unit to a prescribed threshold, and outputs a signal representing a result of said comparison to the control unit,
   wherein the control unit controls the cooling unit to start or stop based on the signal outputted by the comparator, the control unit increasing the control gain when the cooling unit is to start or stop.

7. The driving device according to claim 1,
   wherein the driver circuit converts the power outputted by the power circuit to a power of a constant voltage or a constant current, and supplies said power that has been converted to the load for at least prescribed periods, and
   wherein the control unit performs feedback control on the driver circuit on the basis of the voltage or the current of power outputted by the driver circuit during said prescribed periods.

8. The driving device according to claim 1,
   wherein the control unit controls a waveform of the voltage or the current of the power outputted by the driver circuit by performing feedback control on the driver circuit on the basis of the voltage or the current of the power outputted from the driver circuit such that the waveform is a pulse wave.

9. A light-emitting device, comprising:
the driving device according to claim 1; and
a light-emitting element as said load.

10. A projection device, comprising:
the light-emitting device according to claim 9.

11. The driving device according to claim 1, further comprising a storage medium that stores the control gain.

12. The driving device according to claim 11, wherein an amount by which the control gain stored in the storage medium is increased is determined on the basis of pulsation that occurs in the voltage or the current outputted by the power source circuit when the voltage or the current of power outputted by the driver circuit is to change.

13. The driving device according to claim 11, wherein an amount by which the control gain stored in the storage medium is increased is determined on the basis of an amount of change in the voltage or the current outputted by the driver circuit when the voltage or the current of the power outputted by the driver circuit is to change.

14. The driving device according to claim 11, wherein a period during which the control gain stored in the storage medium is increased is determined on the basis of pulsation that occurs in the voltage or the current outputted by the power source circuit when the voltage or the current of power outputted by the driver circuit is to change.

15. The driving device according to claim 11, wherein a period during which the control gain stored in the storage medium is increased is determined on the basis of an amount of change in the voltage or the current outputted by the driver circuit when the voltage or the current of the power outputted by the driver circuit is to change.

16. The driving device according to claim 11, further comprising:
- a temperature detection unit that detects a temperature external to the driving device;
- a cooling unit connected to an output unit of the power source circuit; and
- a comparator that performs comparison of a temperature detected by the temperature detection unit to a prescribed threshold, and outputs a signal representing a result of said comparison to the control unit,
wherein the control unit controls the cooling unit to start or stop based on the signal outputted by the comparator, the control unit increasing the control gain when the cooling unit is to start or stop.

17. A method of controlling a power source circuit that converts power inputted thereto to a constant power and outputs the power that has been converted, and a driver circuit that receives the power outputted by the power source circuit and outputs a power to a load, the method comprising:

performing feedback control on the power source circuit by receiving a voltage or a current of the power outputted by the power source circuit as a detected value, obtaining a value by multiplying a difference of the detected value and a constant target value by a control gain, and by outputting a feedback signal based on said value to the power source circuit; and increasing the control gain when a voltage or a current of power outputted from the driver circuit is to change.

18. A non-transitory storage medium to be read by a control unit of a driving device, the driving device including:

a power source circuit that converts power inputted thereto to a power of a constant voltage or a constant current, and then outputs said power that has been converted;

a driver circuit that receives the power outputted by the power source circuit and outputs a power to the load; and said control unit, the control unit performing feedback control on the power source circuit and feedback control on the driver circuit to control a voltage or a current of the power outputted by the driver circuit, the storage medium storing a data array in which a plurality of data are arranged in chronological order, the plurality of data including a control gain to be used by the control unit such that when the storage medium is read by the control unit, the control unit successively reads in the control gain to perform said feedback control on the power source circuit by receiving the voltage or the current of the power outputted by the power source circuit as a detected value, obtaining a value by multiplying a difference of the detected value and a constant target value by the control gain retrieved from the storage medium, and outputting a feedback signal based on said value to the power source circuit, wherein the control gain in the data array is set to a constant value except when the voltage or the current of the power outputted by the driver circuit is to change, the control gain being set to a value greater than the constant value when the voltage or the current of the power outputted by the driver circuit is to change.

* * * * *